(12) United States Patent
Koitabashi

(10) Patent No.: US 7,853,160 B2
(45) Date of Patent: Dec. 14, 2010

(54) IMAGE FORMING APPARATUS

(75) Inventor: Kei Koitabashi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 800 days.

(21) Appl. No.: 11/526,705

(22) Filed: Sep. 26, 2006

(65) Prior Publication Data
US 2007/0071462 A1 Mar. 29, 2007

(30) Foreign Application Priority Data
Sep. 29, 2005 (JP) ............................. 2005-284192

(51) Int. Cl.
G03G 15/00 (2006.01)
G03G 21/00 (2006.01)

(52) U.S. Cl. ............................................ 399/24; 399/9

(58) Field of Classification Search ............... 338/22 R, 338/309, 312, 314, 322, 324, 327–8; 427/102, 427/103; 228/101; 219/541; 399/9, 24–30; G03G 15/00, G03G 21/00; B41J 29/48
See application file for complete search history.

(56) References Cited

U.S. PATENT DOCUMENTS

| | | | | |
|---|---|---|---|---|
| 6,275,664 | B1 * | 8/2001 | Wolf et al. | 399/8 |
| 6,915,090 | B2 * | 7/2005 | Fukaya | 399/85 |
| 7,009,719 | B2 * | 3/2006 | Willis et al. | 358/1.1 |
| 7,065,497 | B1 * | 6/2006 | Brewster et al. | 705/14.61 |
| 2003/0077086 | A1 * | 4/2003 | Phillips | 399/24 |
| 2005/0276618 | A1 * | 12/2005 | Clement et al. | 399/24 |
| 2006/0039707 | A1 * | 2/2006 | Mima | 399/23 |
| 2006/0055959 | A1 * | 3/2006 | Iwakura et al. | 358/1.14 |
| 2006/0227368 | A1 * | 10/2006 | Hong | 358/1.15 |

FOREIGN PATENT DOCUMENTS

| | | |
|---|---|---|
| JP | 06-268781 | 9/1994 |
| JP | 10315590 A | * 12/1998 |

OTHER PUBLICATIONS

Machine Translation of JP 10315590 A.*

* cited by examiner

Primary Examiner—Judy Nguyen
Assistant Examiner—Wyn' Q Ha
(74) Attorney, Agent, or Firm—Rabin & Berdo, P.C.

(57) ABSTRACT

The goal of the present invention is, while waiting for reserved printing that is to be executed at a future time, even in a case where new printing is executed before then, to compare the remaining amount of consumable material to the amount of consumable material necessary for the designated reserved printing. The terminal apparatus that sent the printing data to execute new printing is notified about the condition of the consumable material. The present invention detects a lack of consumable material by comparing the remaining amount of consumable material to the amount of consumable material necessary for the reserved printing. Therefore, a user using the terminal apparatus can be informed about the information concerning the consumable material by having the terminal apparatus, which newly sent the printing data, notified of the information concerning the detected consumable material.

20 Claims, 15 Drawing Sheets

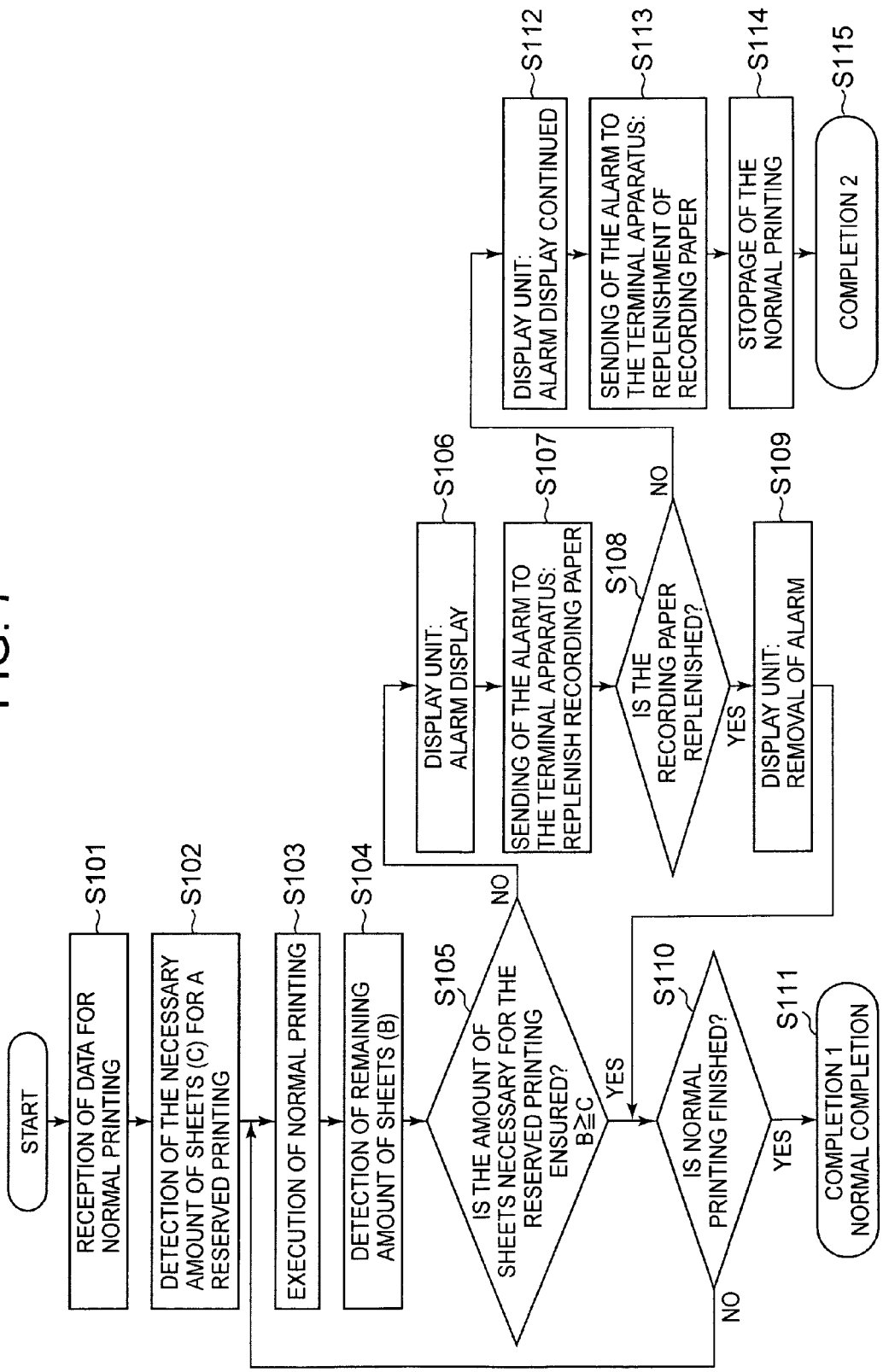

FIG. 8

THERE IS INSUFFICIENT RECORDING
PAPER FOR NORMAL PRINTING.PLEASE
REPLENISH THE RECORDING PAPER.
TRAY 1   REPLENISHMENT OF
                PRINTING PAPER
                        PRINTING RESERVATION

FIG. 9

THE RECORDING PAPER HAS BECOME
INSUFFICIENT FOR NORMAL PRINTING.
PLEASE REPLENISH THE RECORDING
PAPER. TRAY 1 A4

[ OK ]    [ CANCEL ]

FIG. 10

THE RECORDING PAPER HAS BEEN
REPLENISHED.
NORMAL PRINTING IS POSSIBLE

PRINTING RESERVATION

FIG. 11

THERE IS INSUFFICIENT RECORDING
PAPER FOR NORMAL PRINTING.PLEASE
REPLENISH THE RECORDING PAPER TO
PERFORM NORMAL PRINTING.
TRAY 1   PRINTING PAPER
                REPLENISHMENT
                        PRINTING RESERVATION

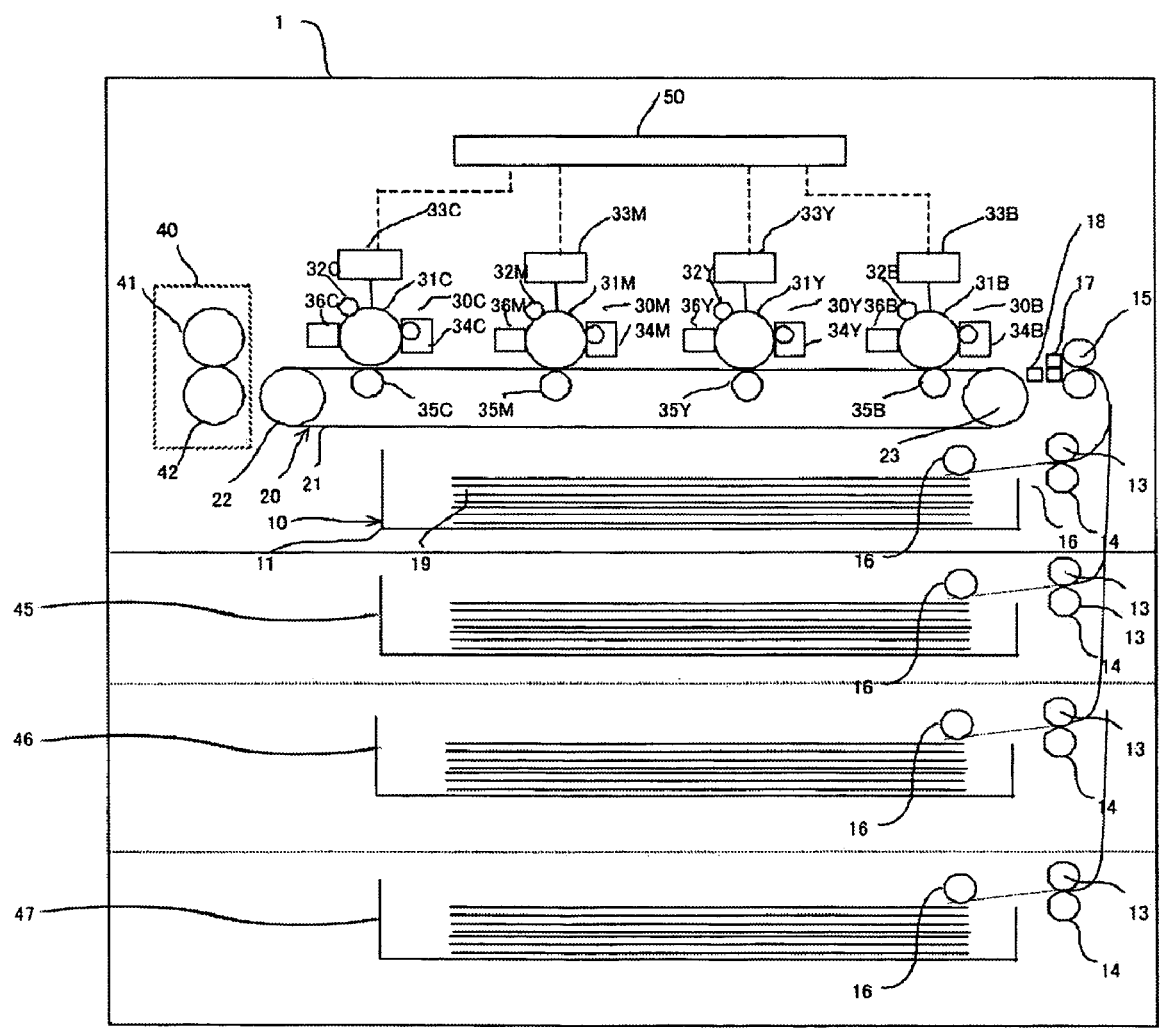

FIG. 20

| ONLINE |
|  |
| PRINTING RESERVATION PRESENT |

FIG. 21

PRINTING RESERVATION CONDITION

|  | PRINTING START SCHEDULED TIME | PRINTING COMPLETION SCHEDULED TIME | NUNBER OF PRINTING SHEETS | RECORDING PAPER SIZE | PRINT TRAY |
|---|---|---|---|---|---|
| JOB 1 | 13:30 | 13:35 | 60 | A4 | TRAY 1 |
| JOB 2 | 14:00 | 14:13 | 180 | A4 | TRAY 1 |
| JOB 3 | 14:44 | 15:00 | 30 | A3 | TRAY 2 |
| JOB 4 |  |  |  |  |  |

| | TRAY 1 | TRAY 2 | TRAY 3 | TRAY 4 |
|---|---|---|---|---|
| REMAINING AMOUNT OF RECORDING PAPER [SHEETS] | 400 | 200 | 300 | 200 |
| NUMBER OF SHEETS RESERVED [SHEETS] | 240 | 30 | 0 | 0 |
| NUMBER OF SHEETS AVAILABLE FOR NORMAL PRINTING [SHEETS] | 160 | 170 | 300 | 200 | ously notified by the user are used as electrophotographic printers, copy machines, and complex machines (see, generally Japanese Patent Application No. hei06-268781). The type of image forming apparatus that reserves printing is used among multiple users and printing is possible from another user while waiting for reservation of the printing.

IMAGE FORMING APPARATUS

BACKGROUND OF THE INVENTION

1. Field of the Invention

The present invention relates to an image forming apparatus by which multiple users on a network can execute printing and designate printing time.

2. Description of Related Art

Conventionally, apparatuses that can reserve printing and designate the printing time to execute printing at the time designated by the user are used as electrophotographic printers, copy machines, and complex machines (see, generally Japanese Patent Application No. hei06-268781). The type of image forming apparatus that reserves printing is used among multiple users and printing is possible from another user while waiting for reservation of the printing.

However, while waiting for reserved printing, the remaining amount of consumable material, such as developer, recording paper, and the like necessary for printing in normal printing of other users, gradually decreases. Therefore, at a time when designated reserved printing is begun, there is a problem of a lack of consumable material.

SUMMARY OF THE INVENTION

The present invention considers the above situation and aims to provide an image forming apparatus that can, while waiting for the reserved printing, inform the terminal apparatus, which newly sent printing data for executing printing, about a condition of the consumable material and can also compare the remaining amount of consumable material to the necessary amount of consumable material necessary for the designated reserved printing.

The image forming apparatus of the present invention forms an image on a medium based on printing data received from a connected terminal apparatus and is capable of designating reserved printing for executing printing at a prescribed time. The image forming apparatus includes a printing data reception unit for receiving the printing data from the terminal apparatus, a reserved printing necessary amount detection unit for detecting a necessary amount of consumable material based on the amount of consumable material used for the designated reserved printing, a remaining amount detection unit for detecting the remaining amount of consumable material, a consumable material comparison unit for comparing the remaining amount detected by the remaining amount detection unit to the necessary amount detected by the reserved printing necessary amount detection unit, and a notification unit for notifying the terminal apparatus about a condition of the consumable material based on the comparison by the consumable material comparison unit.

In the image forming apparatus of the present invention, a lack of the consumable material can be detected by comparing the necessary amount of consumable material for the reserved printing to the amount of consumable material remaining. A user using the terminal apparatus can be notified of the consumable material information by notifying the terminal apparatus that newly received the printing data about the information concerning the detected consumable material. Therefore, even in a case where there is a lack of consumable material during execution of image formation based on the designated reserved printing, the lack of consumable material during printing can be prevented by previously notifying the terminal apparatus of this condition and having the user replenish the consumable material.

BRIEF DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein:

FIG. 7 is a diagram describing the process executed by a control unit in a case where reserved printing is designated and normal printing is newly received in the image forming apparatus of the first embodiment;

FIG. 8 is a diagram showing an example display displayed in a display unit of the image forming apparatus of the first embodiment;

FIG. 9 is a diagram showing an example display displayed in the terminal apparatus in the first embodiment;

FIG. 10 is a diagram showing an example display displayed in the display unit of the image forming apparatus of the first embodiment;

FIG. 11 is a diagram showing an example display displayed in the display unit of the image forming apparatus of the first embodiment;

FIG. 12 is a diagram showing an example display displayed in the terminal apparatus in the first embodiment;

FIG. 13 is a diagram showing another general structure of the image forming apparatus of the first embodiment;

FIG. 20 is a diagram showing an example display displayed in the display unit of the image forming apparatus of the third embodiment;

FIG. 21 is a diagram showing information sent to the terminal apparatus in the third embodiment;

DESCRIPTION OF PREFERRED EMBODIMENTS

First Embodiment

Figure 1:
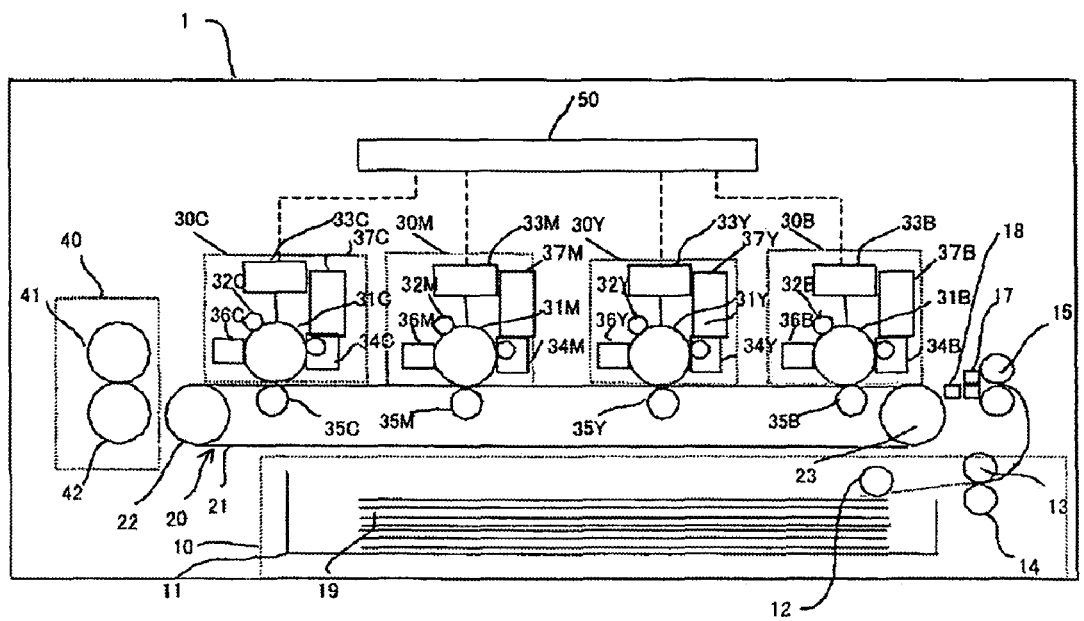
FIG. 1 is a diagram showing the general structure of the image forming apparatus of the first embodiment.

FIG. 1 is a diagram showing one example of the structure of the image forming apparatus described in the first embodiment. The image forming apparatus described in the first embodiment contains a paper supply unit 10, a feed belt mechanism 20, an image forming unit 30, a fusion unit 40, and a control unit 50.

The paper supply unit 10 is formed of the print tray 11, a pickup roller 12, a feed roller 13, a retard roller 14, a registration roller pair 15, a paper thickness detection unit 17, and an edge sensor 18.

The print tray 11 can store any size of recording paper 19 serving as the medium on which the image is formed. For example, the print tray 11 can hold 550 sheets of the recording paper 19. The print tray 11 is a box-shaped unit having at least an opening on top for removing the recording paper 19 serving as the medium. A scale is formed on the side of the print tray 11 having, for example, marks for every 100 sheets of paper. The print tray 11 is equipped with a reflective sensor 66, described below, for detecting the remaining amount of the recording paper 19.

The pickup roller 12 is disposed furthest upstream in the feeding path and has its rotation driven by a drive motor, not shown, that can rotate back and forth. The pickup roller 12 can contact and be removed from the topmost sheet of a stack of the recording paper 19 stored in the print tray 11 and, because the rotation of the roller is driven by the drive motor, the roller can feed the topmost sheet of the stack of the stored recording paper 19 in a direction of the feeding path or in a direction opposite that of the feeding path.

The feed roller 13 is disposed downstream from the pickup roller 12. The feed roller 13 has its rotation driven by the drive motor, not shown, that can rotate back and forth, and feeds the recording paper in the direction of the feeding path or in the direction opposite that of the feeding path.

The retard roller 14 is disposed downstream from the pickup roller 12. The retard roller 14 has its rotation driven by the drive motor, not shown, that can rotate back and forth, and, together with the feed roller 13, feeds the recording paper in the direction of the feeding path or in the direction opposite that of the feeding path. The retard roller 14 separates the recording paper 19 into single sheets by rotating in the direction opposite that of the feed roller at a time when the retard roller 14 and the feed roller 13 sandwich the recording paper 19 fed from the pickup roller 12.

The registration roller pair 15 is disposed downstream from the retard roller 14. The registration roller pair 15 has its rotation driven by the drive motor, not shown, that can rotate back and forth, and feeds the recording paper in the direction of the feeding path or in the direction opposite that of the feeding path. The registration roller pair 15 contacts an edge of the recording paper 19 and corrects oblique feeding of the fed recording paper 19 by beginning rotation after a prescribed amount of the recording paper 19 has been fed. The recording paper 19 is then sent to the image forming unit 30 after the oblique feeding is corrected.

The paper thickness detection unit 17 is disposed downstream from the registration roller pair 15. The paper thickness detection unit 17 detects the thickness of the recording paper 19 stopped one time by the detection of the recording paper 19 from the edge sensor 18 when the recording paper 19 fed along the feeding path passes through the paper thickness sensor 7. The thickness of the recording paper 19 detected by the paper thickness detection unit 17 is transmitted as a signal to the control unit 50 and sent to a CPU 51, described below. The thickness of one sheet of the recording paper 19 is stored in a RAM 52 as a default value $\alpha 0$. The default value $\alpha 0$ can be changed every time when recording paper of various thicknesses is set as the recording paper in the printing tray 11.

The edge sensor 18 is disposed downstream from the paper thickness detection unit 17. The edge sensor 18 detects the presence of the recording paper 19, transmits this information as a signal to the control unit 50, and sends the information to the print engine control unit 55, described below. The print engine control unit 55 stops the feed of the recording paper detected by the edge sensor 18 one time and the paper thickness detection unit 17 then detects the thickness of the recording paper 19. The image forming unit 30, described below, forms the image based on printing data received from the edge sensor 18 under the control of the print engine control unit 55.

Figure 2:
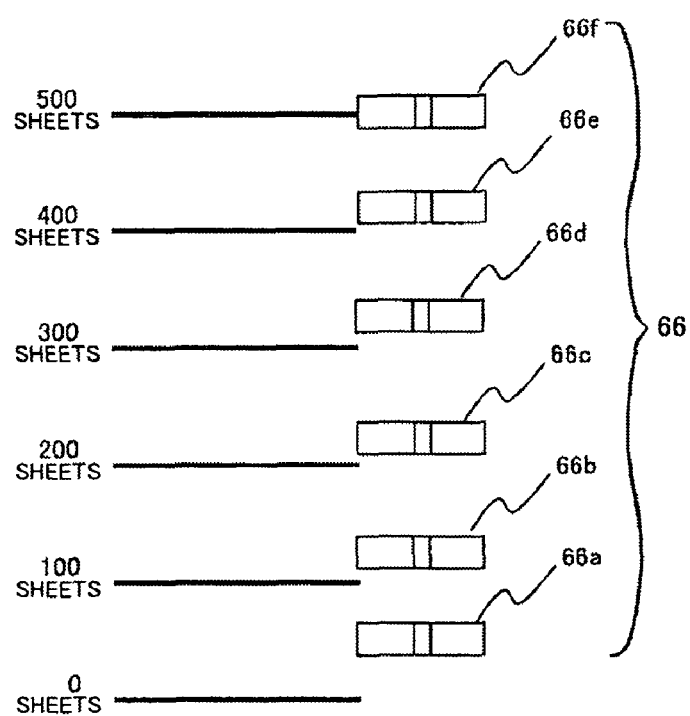
FIG. 2 is a diagram showing the describing the inside of a print tray of the first embodiment.

As shown in FIG. 2, multiple reflective sensors 66 are equipped by the print tray 11 corresponding to the location of the scale equipped on the side of the print tray 11. The reflective sensor 66 contains a light emission unit that emits reflecting light and a light reception unit that receives reflected light, disposed adjacently. The light emitted by the light emission unit is reflected onto the recording paper 19 and a sensor detects the presence of the recording paper 19 by receiving the reflected light. Under the control of a remaining amount detection unit 61 of the control unit 50, described below, the output of the reflective sensor 66 is a signal transmitted to the remaining amount detection unit 61 concerning whether the emitted light is reflected and received by the light reception unit.

For example, described providing the print tray 11 capable of storing a maximum of 550 sheets of recording paper 19 with normal thickness, a mark is made on the scale for every 100 sheets of recording paper 19. Further, reflective sensors 66b, 66c, 66d, and 66e are each equipped, for example, corresponding to 100 sheets, 200 sheets, 300 sheets, and 400 sheets with a mark 25 sheets above. A reflective sensor 66f, corresponding to the mark at 500 sheets, is also equipped. A reflective sensor 66a is equipped to correspond, for example, not to 0 sheets but rather to above 50 sheets.

A consumable material detection unit 61 receives the signal of the multiple reflective sensors 66 described above and can roughly detect the remaining amount of consumable material by entering the received signal into Table 1, shown below. For example, in a case where 130 sheets of the recording paper 19 are stored in the print tray 11, the reflective sensors 66a and 66b detect the presence of the recording paper 19 and send a signal with this information to the consumable material detection unit 61. The reflective sensors 66c, 66d, 66e, and 66f do not detect the recording paper 19 and send a signal with this information to the consumable material detection unit 61. Using the table below, the consumable material detection unit 61 can detect that there are 100 sheets or more of the recording paper 19, based on the received signals.

TABLE 1

| 66a | 66b | 66c | 66d | 66e | 66f | REMAINING AMOUNT OF RECORDING PAPER |
|---|---|---|---|---|---|---|
| ○ | ○ | ○ | ○ | ○ | ○ | APPROXIMATELY 500 SHEETS |
| ○ | ○ | ○ | ○ | ○ | X | ABOVE 400 SHEETS |

TABLE 1-continued

| 66a | 66b | 66c | 66d | 66e | 66f | REMAINING AMOUNT OF RECORDING PAPER |
|-----|-----|-----|-----|-----|-----|-------------------------------------|
| ○ | ○ | ○ | ○ | X | X | ABOVE 300 SHEETS |
| ○ | ○ | ○ | X | X | X | ABOVE 200 SHEETS |
| ○ | ○ | X | X | X | X | ABOVE 100 SHEETS |
| ○ | X | X | X | X | X | ABOVE 50 SHEETS |
| X | X | X | X | X | X | BELOW 50 SHEETS |

○: Detection of recording paper
X: No detection of recording paper

The feed belt mechanism 20 is formed of a transfer unit 35, a drive roller 22, a driver roller 23, and a feed belt 21. The feed belt mechanism 20 can feed the recording paper 19 downstream while the image formed by the image forming unit 30 is transferred to the recording paper 19.

The feed belt 21 conveys the rotation of the drive roller 22 to the driver roller 23, sequentially feeds the recording paper 19 sent from the paper supply unit 10 to the image forming units 30 of various colors described below, and a toner image of each color is formed on the recording paper 19.

The drive roller 22 has its rotation driven by a drive motor, not shown, that can rotate back and forth, and rotates the feed belt 21 to feed the recording paper 9 in a prescribed direction. The drive roller 22 then rotates the driver roller 23 via the feed belt 21. The rotation of the drive roller 22 rotates the drive belt 21 and feeds the recording paper 19 from the paper supply unit 10 in the prescribed direction to the fusion unit 40 via the image formation unit 30, so that the toner image is formed on the recording paper 19.

The driver roller 23 is affixed rotatably on an axis and rotates in accordance with the drive rotation of the drive roller 22 via the feed belt 21.

The transfer unit 35 is disposed beneath the image forming units 30 of each color and is a rotating roller to which a prescribed voltage is applied. A transfer unit 35B is equipped beneath an image forming unit 30B that forms black (B) toner images. A transfer unit 35Y is equipped beneath an image forming unit 30Y that forms yellow (Y) toner images. A transfer unit 35M is equipped beneath an image forming unit 30M that forms magenta (M) toner images. A transfer unit 35C is equipped beneath an image forming unit 30C that forms cyan (C) toner images. The toner image formed on a photosensitive body 31 of the image forming unit 30, described below, can be transferred to the fed recording paper 19 by electric attraction.

Figure 3:
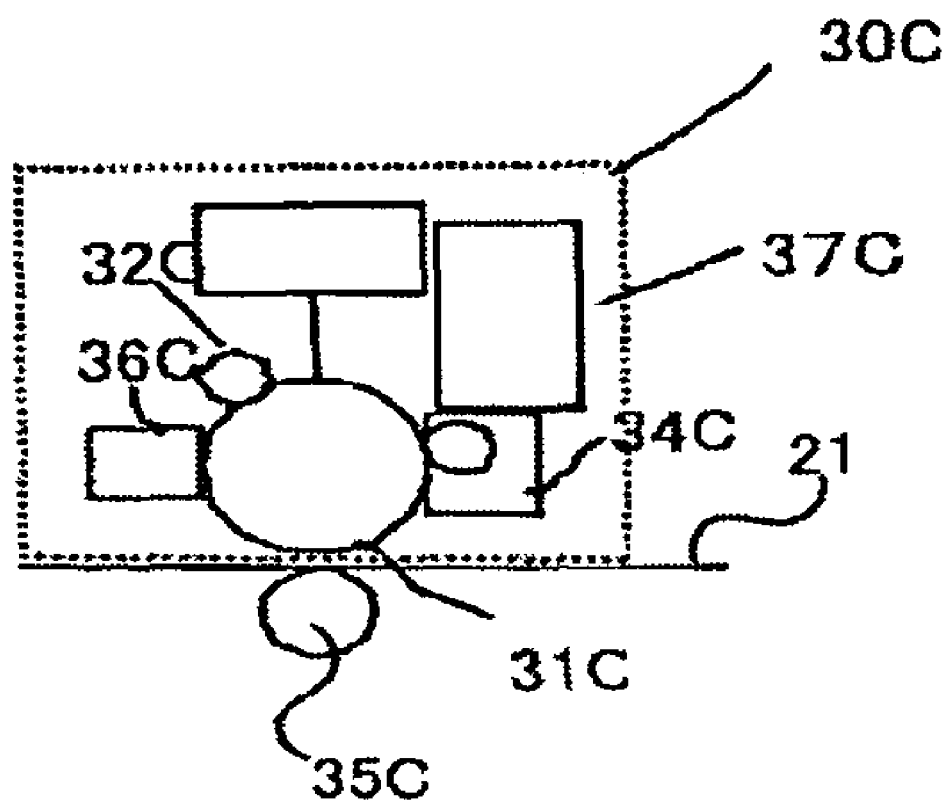
FIG. 3 is a diagram describing the image forming unit of the first embodiment.

The image forming unit 30, as shown in FIG. 3, is formed of the photosensitive body 31, a charge unit 32, an exposure unit 33, a development unit 34, a cleaning unit 36, and a toner cartridge 37. The image forming unit 30 is formed of the image forming units 30C, 30M, 30Y, and 30K having cyan, magenta, yellow, and black colored developer respectively, staring upstream in the feed belt mechanism 20. Here, an explanation will be given using the image forming unit 30C having cyan toner. The image forming units 30M, 30Y, and 30B having magenta, yellow, and black toner respectively will have explanations omitted because, aside from color, they are the same as the image forming unit 30C having cyan toner.

A photosensitive body 31C is formed in a manner such that it can accumulate charge on the surface of the electrostatic latent image carrier using a charge unit 32C. The photosensitive body 31C, for example, is affixed rotatably on an axis, the axis being a shaft affixed to both ends of a frame, not shown, in which the photosensitive body 31C is held. The photosensitive body 31C is formed such that the charge accumulated on the surface can be removed by exposure by an exposure unit 33C. The photosensitive body 31C forms the toner image by attracting toner, serving as developer, to the electrostatic latent image formed on the surface thereof.

The charge unit 32C can accumulate charge on the surface of the photosensitive body 31C by applying a prescribed positive or negative voltage to the photosensitive body 31C. The charge unit 32C, for example, is a semiconductive charge roller affixed rotatably to an axis on a frame, not shown, to contact the surface of the photosensitive body 31 with a certain pressure. To apply the prescribed voltage to the photosensitive body 31C, the charge unit 32 is controlled by the print engine control unit 55 of the control unit 50.

The exposure unit 33C is disposed above the photosensitive body 31C further downstream in the rotation of the photosensitive body 31C than the charge unit 32C. The exposure unit 33C is, for example, an LED (Light emitting diode) head, a laser, or the like and, by exposure, removes the charge accumulated on the surface of the photosensitive drum 31 by the charge unit 32 and forms the electrostatic latent image on the surface of the photosensitive body 31C. The exposure unit 33C is controlled by the print engine control unit 55 of the control unit 50 and executes exposure via the print engine control unit 55 based on a print job including printing data sent to the image forming apparatus.

A development unit 34C supplies toner with the prescribed charge to the surface of the photosensitive body 31C using magnetic attraction, so that toner is attached to a portion of the surface of the photosensitive drum 31C from which charge was removed by exposure, thereby forming the toner image on the surface of the photosensitive body 31C. The development unit 34C is, for example, disposed further downstream in the rotation of the photosensitive body 31C than the exposure unit 33C and is affixed rotatably to an axis on a frame, not shown, to contact the surface of the photosensitive body 31C with a certain pressure. The development unit 34C is controlled by the print engine control unit 55 of the control unit 50 and charges the toner with the prescribed charge.

A cleaning unit 36C is formed from a prescribed elastic material, is disposed further upstream in the rotation of the photosensitive body 31C than the charge unit 32C, and is affixed in a manner to contact the surface of the photosensitive body 31C with a certain pressure. The cleaning unit 36C removes the toner remaining on the surface of the photosensitive body 31C, thereby cleaning the photosensitive body 31C.

A toner cartridge 37C stores cyan (C) toner and is disposed in a removable and insertable manner above a toner tank, not shown, near the development unit 34C. The toner cartridge 37C supplies the stored toner to the toner tank below. The toner in the toner tank is then supplied to the development unit 34C.

The fusion unit 40 is formed of a fusion roller 41 and a pressure roller 42. The fusion unit 40 is disposed furthest downstream of the image forming units 30 of each color in the feeding path. The fusion roller 41, for example, fuses the toner onto the recording paper 19, on which the toner image is formed by the image forming unit 30, using pressure and heat of the pressure roller 42, a heater, or the like. The recording paper 19 onto which the toner is fused is then delivered outside the apparatus to a delivery stack or the like, not shown.

Figure 4:
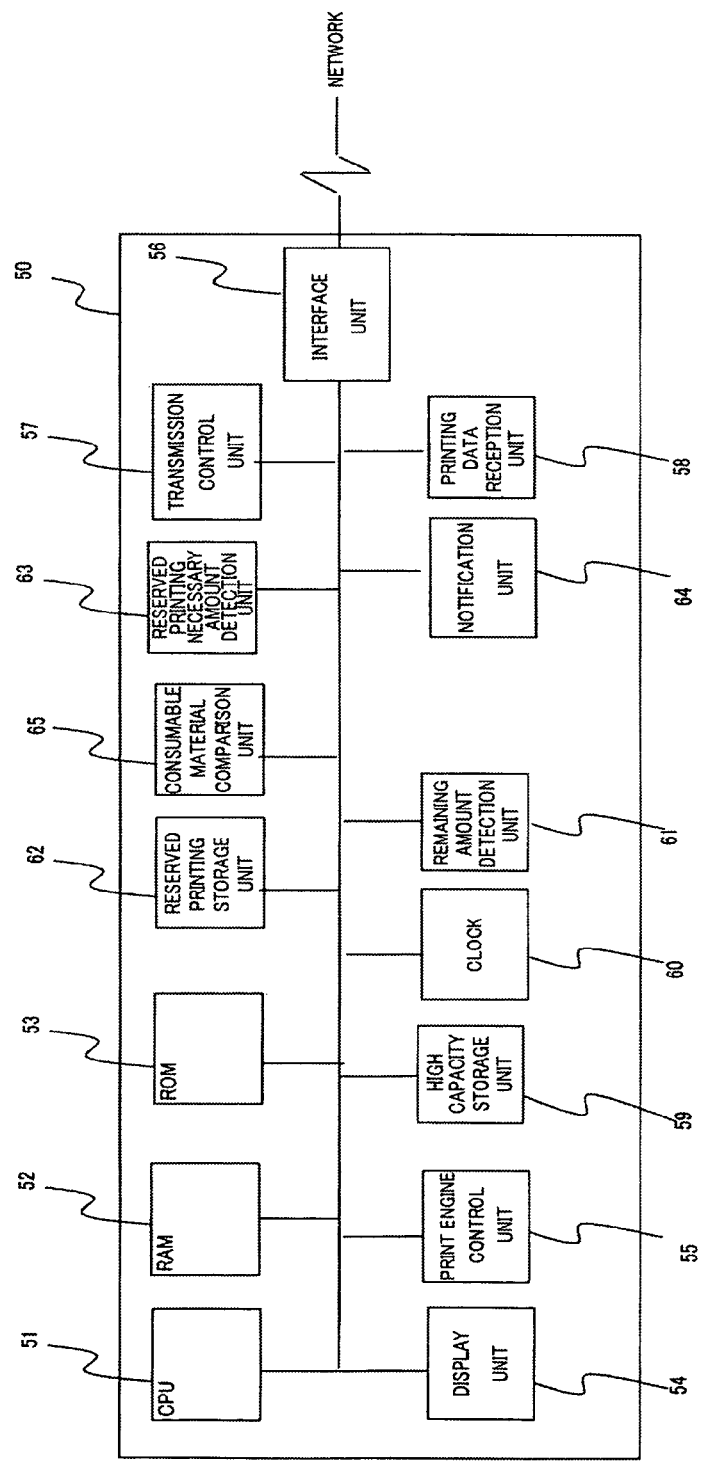
FIG. 4 is a block diagram showing the construction of the of the image forming apparatus of the first embodiment.

The control unit 50, as shown in FIG. 4, is formed of a CPU (Central Processing Unit) 51, a RAM (Random Access Memory) 52, a ROM (Read Only Memory) 53, a display unit 54, the print engine control unit 55, an interface unit 56, a transmission control unit 57, a printing data reception unit 58, a high capacity storage unit 59, a clock 60, a remaining amount detection unit 61, a reserved printing storage unit 62, a reserved printing necessary amount detection unit 63, a notification unit 64, and a consumable material comparison unit 65.

The CPU 51 is formed by a microprocessor and performs a program stored in the ROM 53. Using the RAM 52, the CPU 51 can execute each process in each unit by performing the program. The CPU 51 stores the thickness of the recording paper 19 detected by the paper thickness detection unit 17 in the RAM 52. The CPU 51 observes the time of the clock 60 and, in a case where the time is equal to the time stored in the reserved printing storage unit 62, the print engine is activated by the print engine control unit 55 and the image is formed based on the designated reserved printing.

The RAM 52 is formed of DRAM (Dynamic RAM), SDRAM (Synchronous DRAM), and the like and is used as a primary storage area for execution of the program. Using a program stored in the ROM 53, the RAM 52 can section of a storage area in the CPU 51 when printing data included in the print job is converted into prescribed image data. For example, the thickness of the recording paper 19 detected by the paper thickness detection unit can be stored.

The ROM 53 is formed of nonvolatile memory such as a flash memory, a UV-EPROM (Ultra-Violet Erasable Programmable Read Only Memory), and an EEPROM (Electronically Erasable and Programmable Read Only Memory), and stores a control program. For example, using a program stored in the ROM 53, printing data can be converted to intermediate data of an intermediate code format for every page based on information concerning consumable material or reserved printing. Further, the intermediate data for every page can be converted into image data of an image format to form the image on the recording paper 19.

The display unit 54 is formed, for example, as an LCD (Liquid Crystal Display) display and is disposed in a location visible from outside of the apparatus. The display unit 54 displays the contents of notification from the notification unit or the condition of the image forming apparatus. In addition, for example, printing can be canceled while the display unit is being watched, via an operation panel, not shown.

The print engine control unit 55 controls the paper supply unit 10, the feed belt mechanism 20, the image forming unit 30, and the fusion unit 40, all of which make up the print engine unit. The print engine control unit 55 controls each of the aforementioned units to form the prescribed image on the recording paper 19 based on the printing data in the high capacity storage area. For example, under instructions from the CPU 51, each unit is controlled to exert appropriate amounts of voltage, heat, or pressure according to the thickness of the recording paper 19 stored in the RAM 52. The print engine control unit 55 then controls the feed belt mechanism 20 and feeds or stops the recording paper 19 so that the paper thickness detection unit 17 can detect the thickness of the recording paper 19.

The interface unit 56 is an interface of the image forming apparatus and connects, via a network, the image forming apparatus to a terminal apparatus sending the printing job containing the printing data or other signals, information, and the like. Here, the print job sent from the terminal apparatus contains printing data of the prescribed image, letters, and such and also contains printing information, corresponding to the printing data, of the number of pages, number of copies, and the like whenever an image is formed based on the printing data. Included in this printing information is consumable material information showing the amount of consumable material to be used and also reserved printing information designated at the designation screen for reserved printing described below. The interface unit 56 executes network communication and communication with a host such as a USB interface and can send and receive various types of data, notification, and signals.

The transmission control unit 57 controls the interface unit 56 and the printing data transmission unit 58 and sends and receives printing data such as various types of data, notification, and signals from the connected terminal apparatus. That is, the transmission control unit 57 can control communication via the interface unit 56.

The printing data transmission unit 58, under the control of the transmission control unit 57, temporarily stores the print job containing the printing data and also the printing information of the information concerning the consumable material and reserved printing, received from the connected terminal apparatus. From the temporarily saved printing job, the printing data reception unit 58 passes the printing data designated by the reserved printing to the high capacity storage unit 59 and passes the reserved printing information such as the designated time and the like included in the print job to the reserved printing storage unit 62. In a print job of normal image formation not designated by the reserved printing, the print job is analyzed under the control of the CPU 51, the print engine unit is activated via the print engine control unit based on the printing data and various types of information beginning with the analyzed consumable material information, and the prescribed image is formed.

The high capacity storage unit 59 is a memory with high capacity such as an HDD (Hard Disk Drive) and stores the printing data designated by the reserved printing received from the terminal apparatus. The printing data is analyzed under the control of the CPU 51 to read the information concerning the number of printing copies, amount of recording paper 19 to be used, and the like. In addition, the printing data stored in the high capacity storage unit 59 is converted into the prescribed image data by the CPU 51, using the RAM 52, based on the program stored in the ROM 53. The image is formed on the recording paper 19 based on the printing data stored in the high capacity storage unit 59.

The clock 60 measures time. When the clock 60 indicates a time designated by the reserved printing information stored in the reserved printing storage unit 62, the printing data stored in the high capacity storage unit 62 is analyzed under the control of the CPU 51. Based on the printing information, the print engine unit is activated via the print engine control unit 55 and the formation of the prescribed image is finished or begun at the prescribed time.

The remaining amount detection unit 61 detects the remaining amount of toner and recording paper 19, which serve as the consumable material in the image forming apparatus. The remaining amount detection unit 61 passes the detected remaining amount of consumable material to the consumable material comparison unit 65. The consumable material comparison unit 65 then compares this amount to the necessary amount of consumable material detected by the reserved printing necessary amount detection unit 63. In addition, the remaining amount detection unit 61 may also calculate the remaining amount by reading the default value $\alpha 0$ of the paper thickness from the RAM 52 in which the paper thickness detected by the paper thickness detection unit 17 is saved. In such a case, the reflective sensor 66 in the print tray 11 detects the thickness of the stack of the recording paper 19, not the number of sheets of the recording paper 19. The number of sheets can roughly be calculated by dividing the detected thickness of the stack of the recording paper 19 by the default value α0.

The reserved printing storage unit 62 temporarily receives the reserved printing information included in the print job from the printing data reception unit 58. The reserved printing storage unit 62 then stores the reserved printing information until the designated time.

The reserved printing necessary amount detection unit 63 detects the necessary amount of toner and recording paper 19, the consumable material necessary for image formation, based on the printing data designated by the reserved printing. At this time, the reserved printing necessary amount detection unit 63 detects the amount of consumable material used in the reserved printing of the received reserved printing information stored in the reserved printing storage unit 62. The amount used may also be the necessary amount of consumable material but, considering trouble with printing or simultaneously sending multiple sheets of the recording paper 19 to the image forming unit 30, an extra amount may be added to the amount used and set as the necessary amount, so that the reserved printing is certain to be completed, even where an excessive amount of consumable material is used because of trouble with printing or simultaneously sending multiple sheets of the recording paper 19 to the image forming unit 30. The reserved printing necessary amount detection unit 63 passes the detected necessary amount of consumable material to the consumable material comparison unit 65, and the consumable material comparison unit 65 then compares this amount to the remaining amount of consumable material detected by the remaining amount detection unit 61.

The notification unit 64 notifies the terminal apparatus and display unit of the image forming apparatus about the condition of the image forming apparatus. The notification unit 64, using the consumable material comparison unit 65, executes notification based on a comparison of the necessary amount of consumable material and the remaining amount of consumable material, and executes notification that image formation or reception of the printing data cannot be achieved.

The consumable material comparison unit 65 compares the remaining amount of consumable material detected by the remaining amount detection unit 61 to the necessary amount of consumable material detected by the reserved printing necessary amount detection unit 62. In a case where the result of the comparison is that the remaining amount is below the necessary amount, various notifications are executed through the notification unit 64.

The image forming apparatus of the first embodiment, formed in the manner described above, operates in the following manner. The image forming apparatus described in the first embodiment focuses on the recording paper 19 serving as the consumable material.

First, the image formation of a normal print job without a designated time for starting and finishing the printing will be explained. The image forming apparatus described in the first embodiment receives via the network the print job from the terminal apparatus connected to the network. The print job is then analyzed under the control of the CPU 51 and the printing data is converted to image data by the RAM 52 using the program stored in the ROM 53.

The image data is passed to the print engine control unit 55. The print engine control unit 55 controls the print engine and forms the electrostatic latent image on the photosensitive body 31 of image forming units 30 of each color based on the printing data. The print engine control unit 55 then supplies the toner of each color to the photosensitive body 31, thereby forming the toner image of each color on the photosensitive body 31.

The print engine control unit 55 supplies the recording paper 19 from the paper supply unit 10, feeds the recording medium using the feed belt mechanism 20, and, in accordance with the feeding of the recording paper 19, transfers the toner image of each color formed on the photosensitive body 31 of each color to the recording paper 19. The print engine control unit 55 then fuses the transferred toner image of each color to the recording paper 19, using the fusion unit 40, and delivers the recording paper 19 outside of the image forming apparatus.

Figure 5:
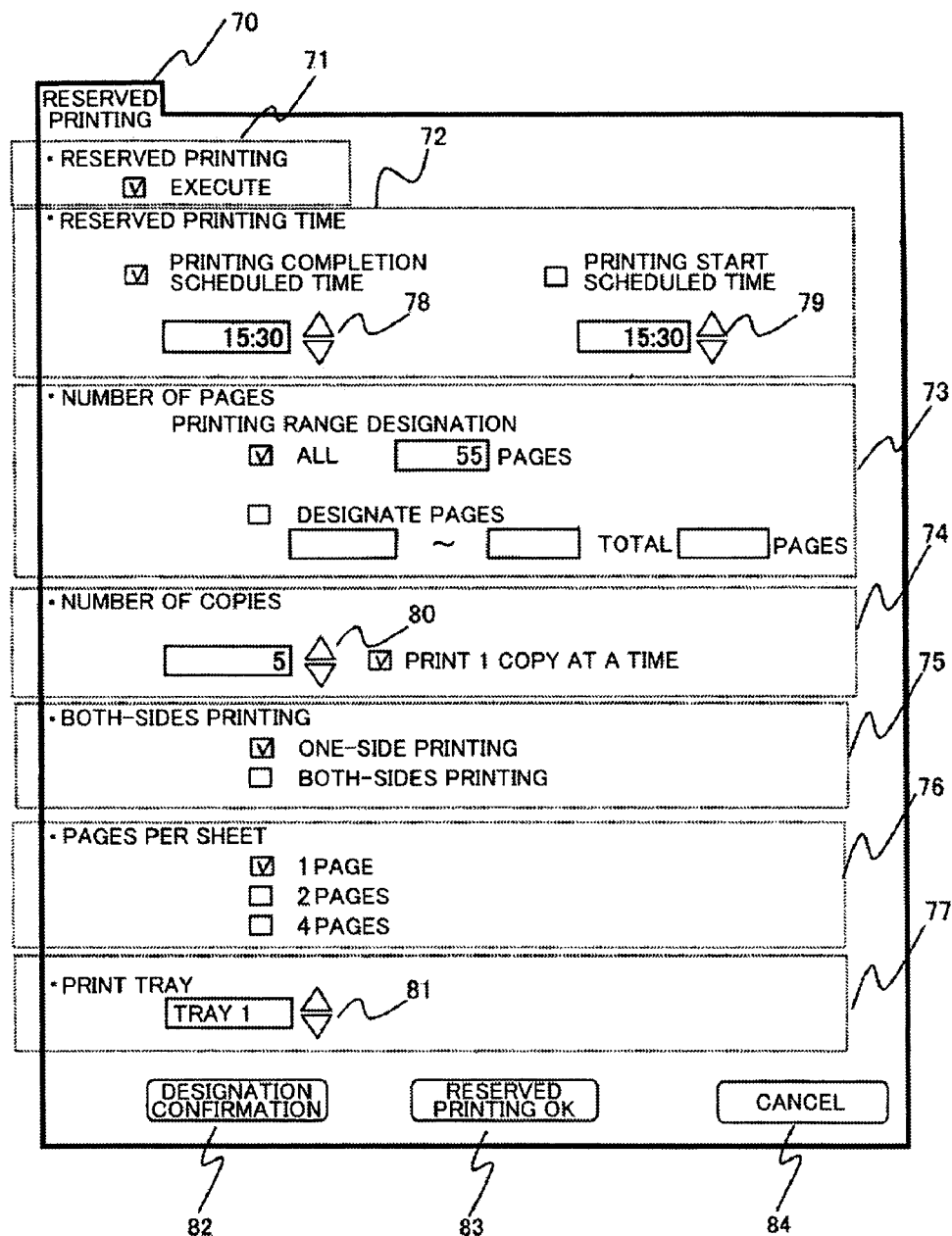
FIG. 5 is a diagram describing a display screen for executing designation of the reserved printing in the first embodiment.

The following is an explanation of the image formation of a reserved printing print job with a designated time for starting and finishing the printing. First, an example of the designation screen for the reserved printing will be described. The designation screen is designated through a device driver of the terminal apparatus when the printing data is sent via the network by the terminal apparatus connected to the image forming apparatus. Upon selection of the reserved printing tab 70 by the designation of the device driver from the printing screen of the terminal apparatus, a screen as shown in FIG. 5 is displayed.

The reserved printing tab 70 contains a reserved printing check box 71, a section for designating reserved printing time 72, a section for designating the number of pages to be printed 73, a section for designating the number of copies to be printed 74, a section for designating printing on both sides 75, a section for designating a page for each sheet 76, a section for designating the print tray 77, a designation confirmation button 82, a reserved printing OK button 83, and a cancel button 84.

The reserved printing check box 71 is a check box for determining whether to perform reserved printing that starts or finishes printing of the printing data at the prescribed time or to perform normal printing that executes printing in the order in which the printing data sent, ignoring the designation of time. Reserved printing can be designated by inputting a check in the check box 71 of the reserved printing with input via the input unit of the terminal apparatus. At this time, until the reserved printing check box 71 is checked, input other than the reserved printing check box 71 and the cancel button 84 can be disabled.

The section 72 for designating reserved printing time is a section for designating the time for beginning or finishing printing of the printing data. In a case where printing is begun at the prescribed time, the scheduled time to start printing is checked by the input from the input unit of the terminal apparatus and the time is designated by a time adjustment button 79 or the like. On the other hand, in a case where printing is to be finished at the prescribed time, the scheduled time to finish printing is checked by the input from the input unit of the terminal apparatus and the time is designated by a time adjustment button 78 or the like.

The section 73 for designating the number of pages to be printed is a section for designating the pages to be printed. For example, in a case where all of the pages are printed, designation is possible by checking all of the check boxes. In addition, in a case where only the prescribed pages are printed, a page assignment check box is checked and the pages are input into the input section.

The section 74 for designating the number of copies to be printed is a section for designating the number of printed copies of the pages designated by the section 73 for designating the number of pages to be printed. The section 74 for designating the number of copies to be printed, for example, is set to one when the designation screen is first opened. The number of copies can be assigned by an assignment button 80. When a number is set for the number of copies, the number of copies to be printed can be designated by entering a check in the check box of the section 74 for designating the number of copies to be printed.

The section 75 for designating printing on both sides is a section for designating whether printing is executed on both sides or on one side. The section 75 for designating printing on both sides, for example, has printing on one side checked when the designation screen is first opened. In a case where printing on both sides is executed, printing on both sides can be designated by entering a check in the check box of the section 75 for designating printing on both sides.

The section 76 for designating a page for each sheet is a section for designating the page number of the printed printing data on one sheet of the recording paper 19. In a case where multiple pages such as two pager or four pages are printed on one sheet of the recording paper 19, printing is executed by shrinking the page size to fit on half, quarter, or the like of one sheet of the recording paper 19. The section 76 for designating a page for each sheet, for example, is set to one when the designation screen is first opened. The printing of two pages of printing data on one sheet of the recording paper 19 can be designated by entering a check in the check box for two pages. The printing of four pages of printing data on one sheet of the recording paper 19 can be designated by entering a check in the check box for four pages.

The section 77 for designating the print tray is a section for designating the selection of the print tray holding the recording paper 19 to be used in the printing. The section 77 for designating the print tray adjusts the number of selectable trays according to the print trays loaded into the image forming apparatus. A section may also be equipped that analyzes the printing data and automatically selects an equipped printing tray holding recording paper 19 of an appropriate size, for cases where the recording paper 19 used is not particularly decided.

The designation confirmation button 82, when pressed, can send to the image forming apparatus the reserved printing information that includes the time for starting or finishing printing designated by the aforementioned designation section. The image forming apparatus receives the reserved printing information and sends it to the reserved printing storage unit. Based on the reserved printing information, the reserved printing necessary amount detection unit 63 detects the amount of the recording paper 19 necessary for the reserved printing and passes this information to the consumable material comparison unit 65.

The remaining amount detection unit 61 of the image forming apparatus detects how many sheets of the recording paper 19 are loaded in the image forming apparatus and passes this information to the consumable material comparison unit 65. The consumable material comparison unit 65 compares the passed necessary amount of recording paper 19 to the remaining amount and, in a case where the remaining amount of recording paper 19 is equal to or more than the necessary amount, reserved printing is possible. The notification unit 64 then notifies the terminal apparatus that reserved printing is possible.

Figure 6:
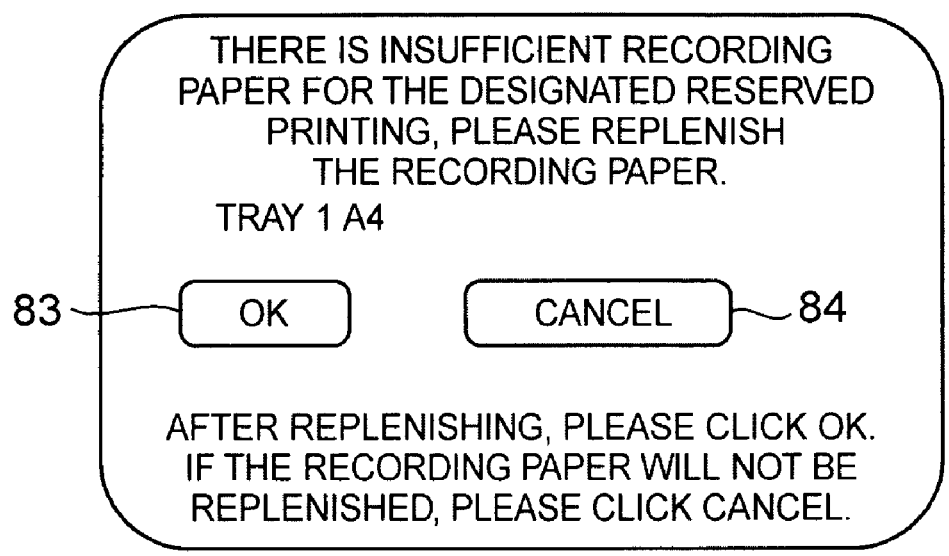
FIG. 6 is a diagram showing an example display displayed in the terminal apparatus in the first embodiment.

If the remaining amount of the recording paper 19 is less than the necessary amount, the notification unit 64 may notify the terminal apparatus that there is insufficient recording paper 19, as shown in FIG. 6. As shown in the example display of FIG. 6, in a case where the condition of insufficient recording paper 19 is displayed in the display unit of the terminal apparatus, a choice can be made to replenish the recording paper 19 or to cancel the reserved printing. In a case where the reserved printing is not cancelled, the display may continue until the recording paper 19 is replenished.

The reserved printing OK button 83, when pressed, can send to the image forming apparatus the print job that includes the printing data. The reserved printing OK button 83 can be pressed upon receiving the notification from the image forming apparatus that printing is possible, as described above. Upon input through the input unit by pressing of the reserved printing OK button 83, the print job is sent to the image forming apparatus and reserved printing is finished.

The cancel button 84, when pressed, cancels the reserved printing designation and erases the designation screen from the display unit.

The reserved printing necessary amount detection unit 63 detects the amount of consumable material used from the reserved printing information. In addition, the necessary time for printing is also detected under the control of the CPU 51. The following is an explanation of the detection of the time and the amount of consumable material needed for the reserved printing.

As described above, the print job designated by the reserved printing contains information about the number of pages to be printed, the number of copies to be printed, whether to print on both sides, and the number of pages on one sheet. In addition, information about color or monochrome printing is included.

Here, a case where the number of pages to be printed is 240 pages will be explained as an example. In the print job containing the printing data, the reserved printing information is such that the number of copies to be printed is one, printing is to be performed on both sides, there are to be two pages per sheet, the size of the recording paper 19 is to be A4, and the printing is to be in color. The number of sheets of the recording paper 19 to be used in the printing is 240 pages×½ (printing on both sides)×½ (two pages per sheet)×1 copy=60 sheets. An extra amount may be added to the necessary amount of consumable material and set as the necessary amount of consumable material in accordance with the designation of the image forming apparatus, so that the possibility of running out of the recording paper 19 during the reserved printing can be lowered, even where an extra amount of the recording paper 19 is used because of trouble with printing or simultaneously sending of multiple sheets of the recording paper 19 to the image forming unit 30. In other words, the possibility of running out of consumable material during the reserved printing can be lowered, even where an extra amount of consumable material is used.

The necessary time for printing, with 30 color pages being printable per minute, is 240 pages×½ (two pages per sheet)×1 copy÷30=4 minutes. Additional preparation time may be added to the necessary time for printing to take into consideration preparation time such as the time necessary for the fusion unit 40 to heat up. For example, in a case where the preparation time is 30 seconds, the necessary time for printing becomes 4 minutes and 30 seconds. The preparation time may be switched to conform to times such as night or day or seasons such as summer or winter. Time necessary for cooling of the fusion unit 40, time for removal of toner by the cleaning unit 36, and the like may be added to the time necessary for printing.

After the number of pages to be printed, the time for starting or finishing the reserved printing, and the like are designated in the reserved printing information through the aforementioned designation screen for reserved printing, the reserved printing information and the printing data are sent as the print job to the image forming apparatus. When the image forming apparatus receives the print job using the printing data reception unit 58 via the interface unit 56 under the control of the transmission control unit 57, the printing data reception unit 58 temporarily stores the print job.

From the print job temporarily stored by the printing data reception unit 58, the reserved printing information of the print job is passed to the reserved printing storage unit 62 and the printing data of the print job is passed to the high capacity storage unit 59. The reserved printing storage unit 62, upon receiving the reserved printing information, stores the reserved printing information until the designated time. At this time, the necessary time for printing and the necessary amount of consumable material for printing previously detected by the reserved printing necessary amount detection unit 63 are both stored. The high capacity storage unit 59 receives and stores the printing data.

The clock 60 that measures time is then referenced under the control of the CPU 51. In the reserved printing information, in a case where the time for finishing the printing is designated, the printing data is read from the high capacity storage unit 59 when a time is reached at which the necessary time for reserved printing stored in the reserved printing storage unit 62 is deducted from the designated time.

In addition, in the reserved printing information, in a case where the time for starting the printing is designated, the printing data is read from the high capacity storage unit 59 when the designated time is reached. At this time, in a case where preparation time for the fusion unit 40 to heat up is necessary, the print engine unit may be activated by the print engine control unit 55 sooner than the designated time to allow for the preparation time.

The printing data read at the prescribed time corresponds to the reserved printing information stored in the reserved printing information storage unit 62 and, along with the print job, is used to form the image in the same manner as the normal printing described above, so that the image can be formed on the prescribed recording paper 19 even for reserved printing in which the prescribed time for starting or finishing printing is designated.

In a case where reserved printing information is stored in the reserved printing information storage area 62, the image forming apparatus executes the following process upon receiving a new print job of normal printing from the terminal apparatus. FIG. 7 is a flow chart for a case where normal printing is executed with reserved printing being designated.

First, through the control of the transmission control unit 57, the printing data transmission unit 58 receives the print job of normal printing from the terminal apparatus via the interface unit 56, as shown in step S101.

Upon reception of the print job, the print job is analyzed under the control of the CPU 51. As shown in step S102, the reserved printing necessary amount detection unit 63 detects the amount of sheets of the recording paper 19 necessary for the reserved printing stored in the reserved printing storage unit 62. At this time, the necessary amount of sheets is set as C.

The printing data of the print job is then converted into image data and the print engine control unit 55, as shown in step S103, controls the print engine unit to form the image on every sheet of the recording paper 19 based on the printing data.

When normal printing is begun, the remaining amount detection unit 61 observes the recording paper 19 used. The remaining amount detection unit 61 then detects the remaining amount of sheets of the recording paper stored in the paper supply tray 11 every time printing is executed on a sheet of the recording paper 19, as shown in step S104. At this time, the remaining amount of sheets is set as B.

The consumable material comparison unit 65 compares the aforementioned detected necessary amount of sheets C and the remaining amount of sheets B. As shown in step S105, the consumable material comparison unit 65 then, by showing that B≧C, makes a judgment as to whether the necessary amount of the recording paper 19 necessary for reserved printing is held. That is, the remaining amount of the recording paper 19 detected by the remaining amount detection unit 61 is compared to the necessary amount of the recording paper 19 detected by the reserved printing necessary amount detection unit 63 and a judgment is made as to whether the remaining amount of sheets B is less than the necessary amount of sheets C.

In a case where the result is that the remaining amount of sheets B is not less than the necessary amount of sheets C, the process moves to step S110 and a judgment is made as to whether printing relating to the print job, the pages printed at step S103, is finished. In a case where the printing is not finished, the process moves to step S103 and the print engine control unit 55 controls the print engine unit to execute printing of the next page. On the other hand, in a case where the printing is finished at step S110, the normal printing newly sent from the terminal apparatus is finished, as shown in step S111.

At step S105, in a case where the remaining amount of sheets B is less than the necessary amount of sheets C, the notification unit 64 notifies the image forming apparatus that there is insufficient recording paper 19 to be used in the normal printing, as shown in step S106, and the display unit 54 of the image forming apparatus displays this information as shown in FIG. 8.

As shown in step S107, the notification unit 64 then sends a notification for prompting the replenishment of the recording paper 19 to be used in the normal printing to the terminal apparatus that sent the print job including the printing data for executing normal printing. As shown in FIG. 9, the notification is then displayed in the display unit 54 of the image forming apparatus. By notifying the terminal apparatus about condition of prompting the replenishment of the recording paper 19 to be used in the normal printing, the user using the terminal apparatus is notified of the condition and can replenish the recording paper 19, so that the necessary amount of the recording paper 19 necessary for the reserved printing can be ensured and the recording paper 19 can be replenished for normal printing as well. Accordingly, the lack of recording paper 19 during reserved printing can be prevented.

At this time, as shown in the example display of FIG. 9, in a case where the condition of insufficient recording paper 19 is displayed in the display unit of the terminal apparatus, a choice is made whether to replenish the recording paper 19 or to cancel the normal printing. In a case where the printing is not cancelled, the display may continue until the recording paper 19 is replenished. The display can be erased by selecting either the cancel button or the OK button.

As shown in step S108, the remaining amount detection unit 61 then makes a judgment as to whether the recording paper 19 has been replenished. In a case where the result is that the recording paper 19 has been replenished, as shown in step S109, the notification unit 64 erases the display, shown in FIG. 8, from the display unit 54. The notification unit 64 then notifies the terminal apparatus that normal printing can be executed because the recording paper 19 has been replenished and this condition is displayed in the display unit 54, as shown in FIG. 10. The process then moves to step S110.

At step S108, in a case where the recording paper 19 has not been replenished, the notification unit 64 sends a notification for prompting the replenishment of the recording paper 19 to the terminal apparatus and this condition is displayed in the display unit 54, as shown in FIG. 11. At this time, the notification unit 64 may make a display as shown in FIG. 11 when the recording paper 19 is not replenished by the prescribed time.

As shown in step S113, the notification unit 64 then notifies the terminal apparatus that printing is stopped because the recording paper 19 necessary for the normal printing has not been replenished, and this condition is displayed in the display unit of the terminal apparatus, as shown in FIG. 12. By sending notification of the stoppage of printing to the terminal apparatus that sent the printing data newly received from the image forming apparatus for the normal printing, the condition of the stoppage of printing can be communicated to the user using the terminal apparatus. The necessary amount of the recording paper 19 necessary for the reserved printing can therefore be ensured. Accordingly, the lack of recording paper 19 during reserved printing can be prevented.

As shown in step S114, the print engine control unit 55 then stops the normal printing. By stopping the formation of the image based on the printing data sent from the terminal apparatus for the normal printing, the necessary amount of the recording paper 19 necessary for the reserved printing can be ensured. Accordingly, the lack of recording paper 19 during reserved printing can be prevented. As shown in step S115, the process is then finished. At this time, the notification unit 64 erases the notification displayed in the terminal apparatus and in the display unit 54 of the image forming apparatus.

When the remaining amount of the recording paper 19 serving as the consumable material becomes less than the necessary amount of the recording paper 19 necessary for the reserved printing, the normal printing, which is related to the print job that includes the normal printing data newly received by the image forming apparatus, is stopped until the recording paper 19 is replenished. Printing can therefore be started or finished at the time designated in the reserved printing because the necessary amount of the recording paper 19 necessary for the reserved printing is ensured.

The image forming apparatus described in the first embodiment may also be an image forming apparatus containing multiple print trays, as shown in FIG. 13. Each of the print trays 11, 45, 46, and 47 are structured in a manner similar to the aforementioned paper supply unit 10 and can form the prescribed image by feeding the recording paper 19 from each tray to the image forming unit 30 and the fusion unit 40 via the feed belt mechanism 20.

By containing the four print trays 11, 45, 46, and 47, in a case where, for example, one print tray can hold 550 sheets of the recording paper 19, 2200 sheets of the recording paper 19 can be stored. Different sizes of the recording paper 19 may be stored in each of the print trays, or each or all of the print trays may hold recording paper 19 of the same size.

In a case where the each or all of the print trays hold recording paper 19 of the same size, in the process occurring when the print job of normal printing of FIG. 7 is newly received, the remaining amount of sheets of the recording paper 19 is not the number of sheets stored in one print tray, but rather may be the total number of sheets of the same size. In other words, the remaining amount of recording paper 19 detected by the remaining amount detection unit 61 is the overall number of sheets of recording paper 19 of the same size stored in each tray, detected as the remaining amount of consumable material. It is therefore possible to contain many sheets of the recording paper 19 serving as the consumable material. The lack of recording paper 19 during reserved printing can therefore be prevented.

In the manner described above, the image forming apparatus described in the first embodiment detects whether there is a lack of consumable material by comparing the necessary amount of recording paper 19 necessary for the designated reserved printing to the remaining amount of recording paper 19 serving as the consumable material. The user using the terminal apparatus can be informed of the consumable material information by notification of the information concerning the consumable material detected by the terminal apparatus that newly receives the printing data. Accordingly, even in a case where there is a lack of consumable material, the lack of consumable material during the image formation based on the designated reserved printing can be prevented by previously notifying the user of this condition.

During the designation of the reserved printing, in a case where the printing data is newly received as the normal printing, the recording paper 19 is consumed, printing is stopped before the amount of recording paper 19 used in the reserved printing becomes insufficient, and printing is not resumed until the recording paper 19 is replenished. Accordingly, the lack of recording paper 19 necessary for reserved printing can be prevented.

Second Embodiment

Figure 14:
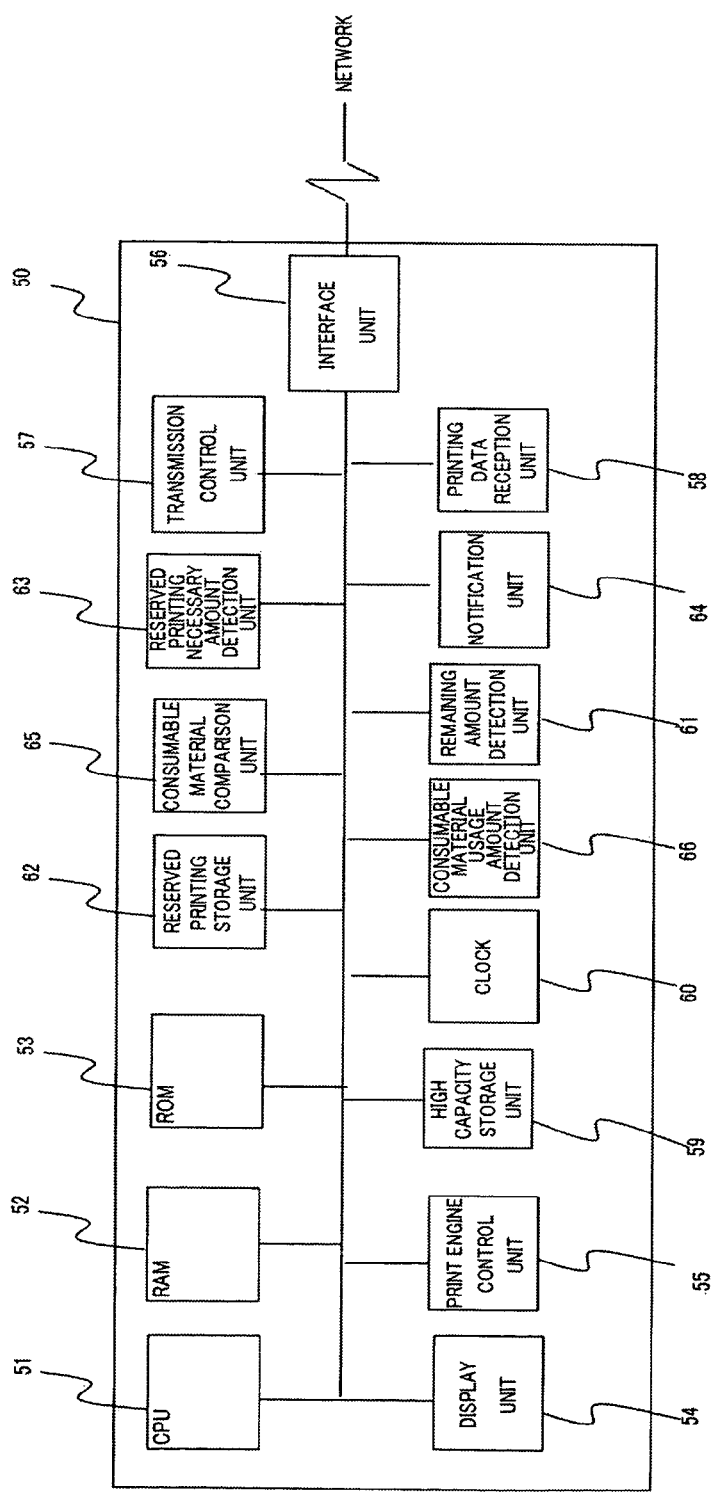
FIG. 14 is a block diagram showing the structure of the image forming apparatus of the second embodiment.

The image forming apparatus described in the second embodiment, as shown in FIG. 14, is an image forming apparatus in which the control unit 50 described in the first embodiment is further equipped with a consumable material usage amount detection unit 66 that detects the amount of consumable material to be used for the newly received printing data. The other units of the image forming apparatus of the second embodiment are the same as those of the first embodiment and therefore the same numbers will be used and explanations will be omitted.

The consumable material usage amount detection unit 66 detects the amount of consumable material to be used to form the image based on the printing data included in the print job without a designated time sent from the terminal apparatus to execute normal printing. The print job received via the interface unit 56 is analyzed under the control of the CPU 51 and the amount of consumable material to be used is detected from the analyzed printing information.

In other words, the amount of recording paper 19 to be used is detected before execution of the image formation based on the printing data of the received print job. The consumable material usage amount detection unit 66 then passes the detected amount of recording paper 19 to be used to the consumable material comparison unit 65.

The consumable material comparison unit 65 receives the information concerning the amount of recording paper 19 to be used for the normal printing from the consumable material usage amount detection unit 66. The consumable material comparison unit 65 then compares the remaining amount of the recording paper 19 detected by the remaining amount detection unit 61 to the amount of the recording medium necessary for the reserved printing detected by the reserved printing necessary amount detection unit 63. At this time, the consumable material comparison unit 65 considers the amount of the recording paper 19 to be used for the normal printing. That is, when reserved printing is designated, in a case where printing data of the print job is newly received, the consumable material comparison unit 65, before executing image formation based on the printing data, deducts the amount of the recording paper 19 to be used for the newly received normal printing from the remaining amount of the recording paper 19 and confirms that this amount is equal to or above the amount of the recording paper 19 necessary for the reserved printing.

In a case where the amount obtained by deducting the amount of recording paper 19 used from the amount of recording paper 19 remaining is equal to or greater than the necessary amount of recording paper 19, the print engine unit is activated by the print engine control unit 55 and the image is formed on the recording paper 19 based on the printing data of the newly received print job for executing normal printing. On the other hand, in a case where the amount obtained by deducting the amount of recording paper 19 used from the amount of recording paper 19 remaining is less than the necessary amount of recording paper 19, notification of the lack of the recording paper 19 is sent to the terminal apparatus that sent the printing data for executing the received normal printing. In a case where the recording paper 19 is not replenished, the formation of the image, based on the printing data of the newly received print job for executing normal printing, is stopped and notification of the stoppage is sent to the terminal apparatus that sent the received printing data for normal printing. That is, the newly received normal printing is not performed.

By detecting the amount of recording paper 19, serving as the consumable material, needed for the normal printing before the normal printing is executed, the lack of the recording paper 19 to be used for reserved printing can be prevented after the normal printing is executed. The stoppage of printing in an unfinished state due to the lack of the recording paper 19 during normal printing can therefore be prevented and needless use of the recording paper 19 can also be prevented. In addition, in the same manner as the first embodiment, the lack of recording paper 19 during reserved printing can be prevented because the amount of the recording paper 19 necessary for the reserved printing is ensured.

Figure 15:
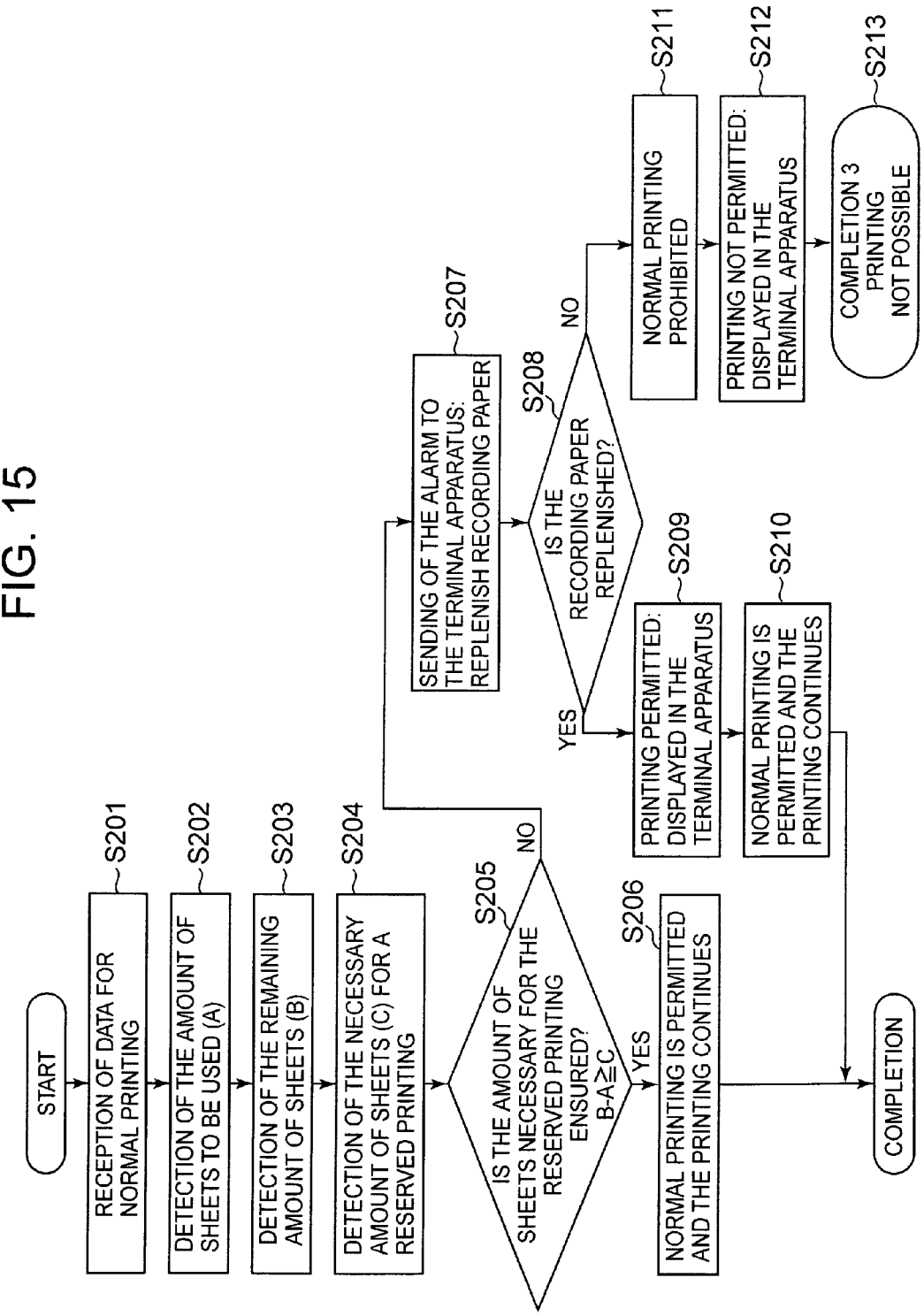
FIG. 15 is a diagram describing the process executed by a control unit in a case where reserved printing is designated and normal printing is newly received in the image forming apparatus of the second embodiment.

The image forming apparatus described in the second embodiment, in a case where reserved printing information is stored in the reserved printing storage unit 62, executes the following process upon newly receiving a print job of normal printing from the terminal apparatus. FIG. 15 is a flow chart for a case where normal printing is executed with reserved printing being designated.

First, through the control of the transmission control unit 57, the printing data transmission unit 58 receives the print job of normal printing from the terminal apparatus via the interface unit 56, as shown in step S201.

Upon reception of the print job, the print job is analyzed under the control of the CPU 51 and the printing information included in the print job is sent to the consumable material usage amount detection unit 66. As shown in step S202, the consumable material usage amount detection unit 66 detects from the printing information the amount of recording paper 19 to be used. At this time, the number of sheets to be used is set as A. The used number of sheets A of recording paper 19 is passed to the consumable material comparison unit 65. The printing information includes information concerning the number of pages to be printed, the number of copies to be printed, whether to perform printing on both sides, the number of pages to be printed per sheet, the print tray to be used, and whether to print in color or monochrome.

As shown in step S203, the remaining amount detection unit 61 then detects the remaining amount of sheets of the recording paper 19 held in the print tray 11. At this time, the remaining number of sheets is set as B. The remaining number of sheets B of recording paper 19 is passed to the consumable material comparison unit 65.

Further, as shown in step S204, the reserved printing necessary amount detection unit 63 detects the amount of sheets of recording paper 19 necessary for the reserved printing stored in the printing sheet number storage unit 62. At this time, the necessary number of sheets is set as C. The necessary number of sheets C of recording paper 19 is passed to the consumable material comparison unit 65.

The consumable material comparison unit 65 references the needed number of sheets A of recording paper 19, detected in the manner described above, and compares the necessary number of sheets C to the remaining number of sheets B. As shown in step S205, the consumable material comparison unit 65 then makes a judgment as to whether the amount of recording paper 19 necessary for reserved printing is ensured using $B-A \geq C$. That is, the consumable material comparison unit 65 makes a judgment as to whether the necessary amount C of recording paper 19 is equal to or less than the amount that is the used number of sheets A detected by the consumable material usage amount detection unit subtracted from the remaining number of sheets B of recording paper 19 detected by the remaining amount detection unit 61.

In a case where the number of sheets A to be used subtracted from the remaining number of sheets B is not less than the necessary number of sheets C, as shown in step S206, normal printing is allowed and the printing data of the received print job of normal printing is converted into image data. The print engine control unit 55 controls the print engine unit to form the image based on printing data on every sheet of the recording paper 19, after which the process is finished.

Figure 16:
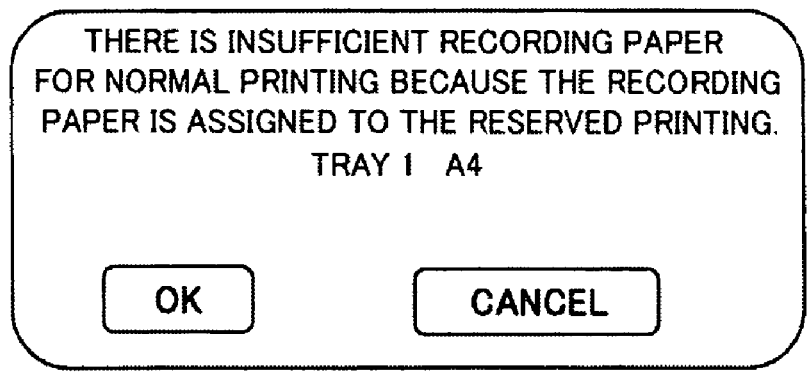
FIG. 16 is a diagram showing an example display displayed in the terminal apparatus in the second embodiment.

At step S205, in a case where the result is that the number of sheets A to be used subtracted from the remaining number of sheets B is less than the necessary number of sheets C, as shown in step S207, the notification unit 64 then sends a notification for prompting the replenishment of the recording paper 19 to be used in the normal printing to the terminal apparatus that sent the print job including the printing data for executing normal printing. As shown in FIG. 16, the notification is then displayed in the display unit 54 of the image forming apparatus. By notifying the terminal apparatus about the prompt for replenishment of the recording paper 19 to be used in the normal printing, the user using the terminal apparatus is notified and can replenish the recording paper 19, so that the necessary amount of the recording paper 19 for the reserved printing can be ensured and the recording paper 19 can be replenished for normal printing as well. Accordingly, the lack of recording paper 19 during reserved printing can be prevented.

At this time, as shown in the example display of FIG. 16, in a case where the condition of insufficient recording paper 19 is displayed in the display unit of the terminal apparatus, a choice is made whether to replenish the recording paper 19 or to cancel the normal printing. In a case where the printing is not cancelled, the display may continue until the recording paper 19 is replenished. The display can be erased by selecting either the cancel button or the OK button.

Figure 17:
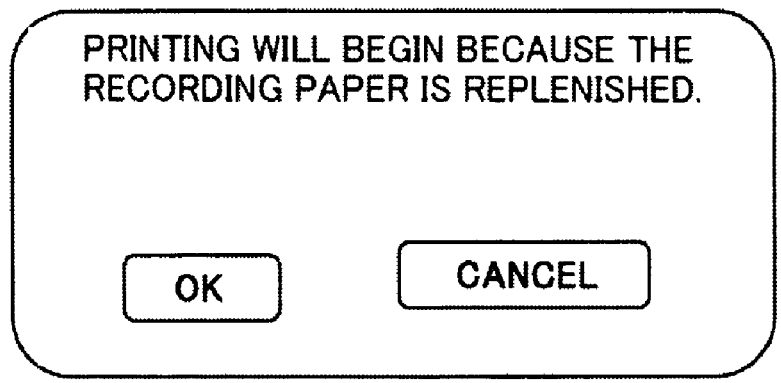
FIG. 17 is a diagram showing an example display displayed in the terminal apparatus in the second embodiment.

As shown in step S208, the remaining amount detection unit 61 then makes a judgment as to whether the recording paper 19 has been replenished. In a case where the result is that the recording paper 19 has been replenished, as shown in step S209, the notification unit 64 notifies the terminal apparatus, which sent the printing data, that the recording paper 19 has been replenished and this replenished condition is displayed in the display unit of the terminal apparatus, as shown in FIG. 17. Next, as shown in step S210, normal printing is allowed and the printing data of the received print job of normal printing is converted into image data. The print engine control unit 55 controls the print engine unit to form the image based on printing data on every sheet of the recording paper 19, after which the process is finished.

At step S208, in a case where the recording paper 19 is not replenished, the normal printing is stopped, as shown in step S211. That is, the print engine control unit 55 stops the formation of the image based on the printing data of the print job received from the terminal apparatus. By stopping the formation of the image based on the printing data sent from the terminal apparatus for the normal printing, the necessary amount of the recording paper 19 necessary for the reserved printing can be ensured. Accordingly, the lack of recording paper 19 during reserved printing can be prevented. In addition, the lack of recording paper during the execution of normal printing can be prevented, therefore also preventing the needless use of the recording paper 19.

Figure 18:
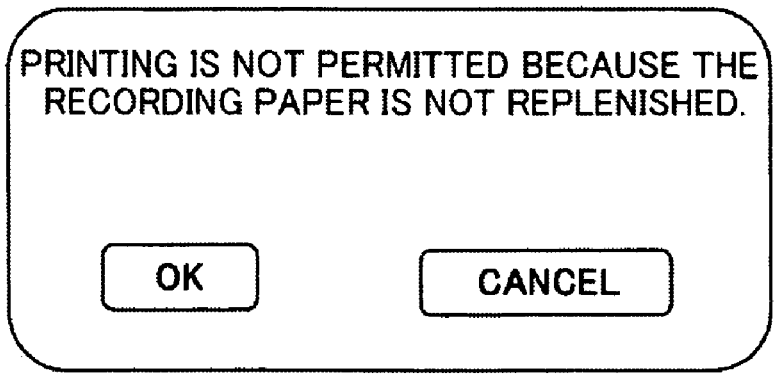
FIG. 18 is a diagram showing an example display displayed in the terminal apparatus in the second embodiment.

As shown in step S212, the notification unit 64 then notifies the terminal apparatus that printing is stopped because the recording paper 19 necessary for the normal printing has not been replenished, and this condition is displayed in the display unit of the terminal apparatus, as shown in FIG. 18. By sending notification of the stoppage of printing to the terminal apparatus that sent the printing data newly received from the image forming apparatus for the normal printing, the condition of the stoppage of printing can be communicated to the user using the terminal apparatus. The necessary amount of the recording paper 19 necessary for the reserved printing can therefore be ensured. Accordingly, the lack of recording paper 19 during reserved printing can be prevented.

As shown in step S213, the process is then finished. At this time, the aforementioned display is erased from the display unit of the terminal apparatus and the display unit 54 of the image forming apparatus.

By forming the image based on the printing data of the newly received printing job, in a case where a judgment is made that the remaining amount of recording paper 19 serving as the consumable material is less than the amount of recording paper 19 necessary for the reserved printing, the normal printing, which is related to the print job that includes the normal printing data newly received by the image forming apparatus, is stopped until the recording paper 19 is replenished. Printing can therefore be started or finished at the time designated in the reserved printing because the necessary amount of the recording paper 19 necessary for the reserved printing is ensured. The designation of reserved printing, formation of the image based on the printing data, and the like are the same as that of the first embodiment and an explanation will therefore be omitted.

In the manner described above, the image forming apparatus described in the second embodiment detects whether there is a lack of consumable material by comparing the necessary amount of recording paper 19 necessary for the designated reserved printing to the remaining amount of recording paper 19 serving as the consumable material. The user using the terminal apparatus can be informed of the consumable material information by notification of the information concerning the consumable material detected by the terminal apparatus that newly receives the printing data. Accordingly, even in a case where there is a lack of consumable material, the lack of consumable material during the image formation based on the designated reserved printing can be prevented by previously notifying the user of this condition.

During the designation of the reserved printing, in a case where the printing data is newly received as the normal printing and a judgment is made referencing the printing data that there is an insufficient amount of recording paper 19 to perform the reserved printing, printing is not resumed until the recording paper 19 is replenished. The user who newly sent the printing data as normal printing from the terminal apparatus replenishes the recording paper 19 to execute the normal printing. Accordingly, the lack of recording paper 19 necessary for reserved printing can be prevented.

Third Embodiment

The image forming apparatus described in the third embodiment is an image forming apparatus having a similar structure to the image forming apparatus of the second embodiment. Units that are the same as those of the second embodiment will be given the same number and an explanation will be omitted.

The image forming apparatus of the third embodiment receives from the terminal apparatus only the printing information included in the newly received print job of normal printing when reserved printing is designated. The consumable material usage amount detection unit 66 detects from the printing information the amount of recording paper 19 serving as the consumable material to be used in the normal printing.

The consumable material comparison unit 65 receives the information concerning the amount of recording paper 19 needed for the normal printing from the consumable material usage amount detection unit 66. The consumable material comparison unit 65 then compares the remaining amount of the recording paper 19 detected by the remaining amount detection unit 61 to the amount of the recording paper 19 necessary for the reserved printing detected by the reserved printing necessary amount detection unit 63. At this time, the consumable material comparison unit 65 considers the amount of the recording paper 19 to be used for the normal printing.

That is, when reserved printing is designated, in a case where printing data of the print job is newly received, the consumable material comparison unit 65, before receiving only the printing information of the print job and before receiving the printing data, subtracts the amount of the recording paper 19 to be used for the newly received normal printing from the remaining amount of the recording paper 19 and confirms that this amount is equal to or above the amount of the recording paper 19 necessary for the reserved printing.

In a case where the amount obtained by subtracting the amount of recording paper 19 to be used from the amount of recording paper 19 remaining is equal to or greater than the necessary amount of recording paper 19, the printing data included in the print job of normal printing is newly received from the terminal apparatus and normal printing is begun. On the other hand, in a case where the amount obtained by deducting the amount of recording paper 19 to be used from the amount of recording paper 19 remaining is less than the necessary amount of recording paper 19; notification of the lack of the recording paper 19 is sent to the terminal apparatus that sent the printing data for executing the received normal printing. In a case where the recording paper 19 is not replenished, the image forming apparatus notifies the terminal apparatus, which sent the printing information, that the recording paper 19 is not replenished, without receiving the printing data of the newly received print job of normal printing.

By receiving only the printing information of normal printing and by detecting the amount of recording paper 19 to be used for the normal printing before receiving the printing data for executing the normal printing, the lack of the recording paper 19 used for reserved printing can be prevented after the normal printing is executed. The burden placed on the network and image forming apparatus is therefore reduced by not receiving printing data that includes information concerning the lack of recording paper 19 serving as the consumable material for reserved printing during execution of the normal printing.

Figure 19:
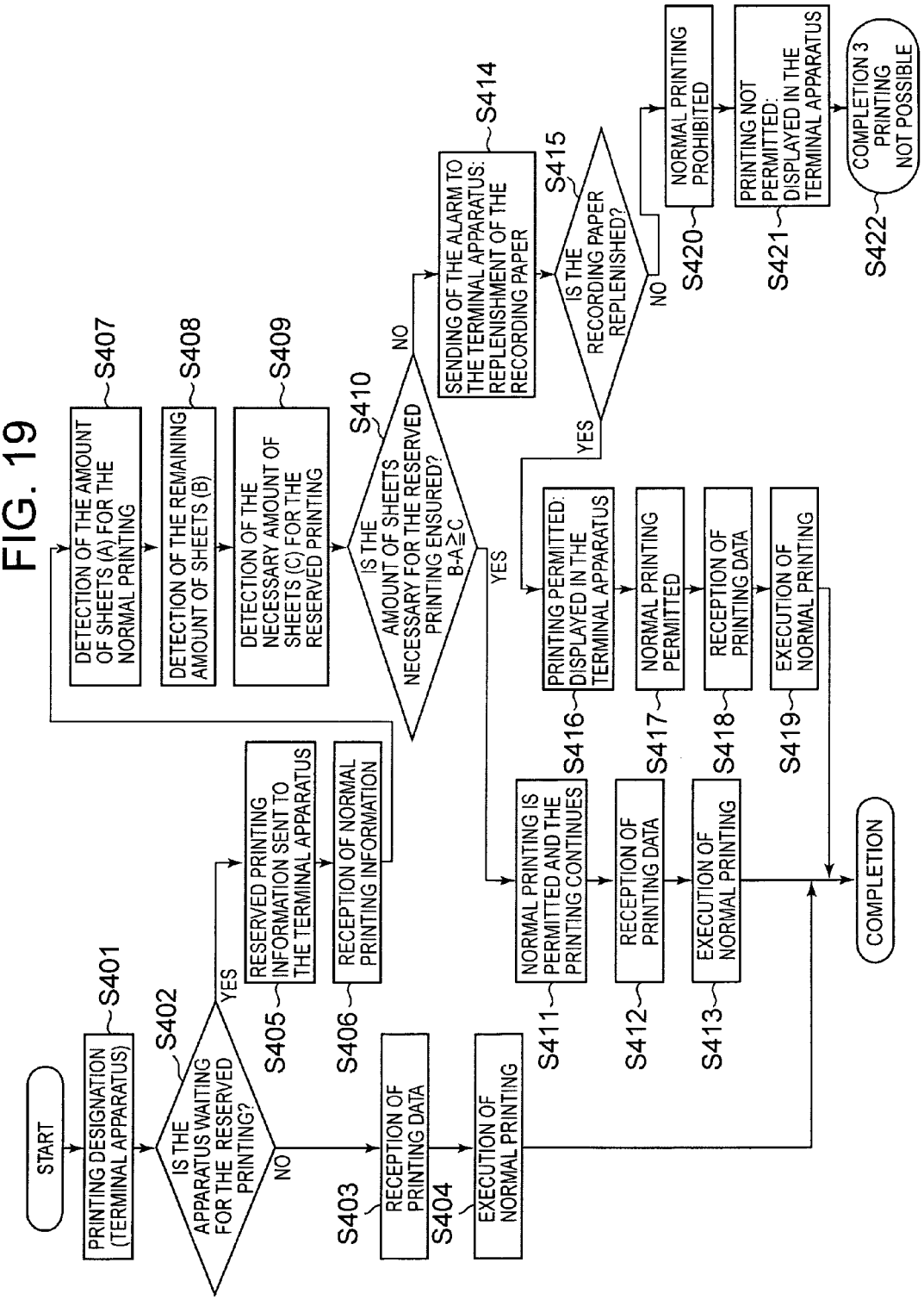
FIG. 19 is a diagram describing the process executed by a control unit in a case where normal printing is received in the image forming apparatus of the third embodiment.

The image forming apparatus described in the third embodiment executes the following procedure. FIG. 19 is a flow chart for a case where normal printing is executed.

First, as shown in step S401, the device driver is opened and designated in the terminal apparatus to execute normal printing without a designated starting or finishing time for the printing. The image forming apparatus receives the designation and executes the following process. As shown in step S402, a judgment is made as to whether the image forming apparatus is in a condition of waiting for reserved printing. The waiting condition can be confirmed by referencing the reserved printing storage unit 62. In a case where reserved printing information is stored in the reserved printing storage unit 62, the waiting condition for the reserved printing is displayed. In a case where reserved printing information is not stored in the reserved printing storage unit 62, a display showing that the image forming apparatus is not in the waiting condition for the reserved printing is displayed.

At step S402, in a case where the image forming apparatus is not waiting for reserved printing, the printing data transmission unit 58, under the control of the transmission control unit 57, receives the print job of normal printing including the printing information from the terminal apparatus, as shown in step S403. The received print job is analyzed under the control of the CPU 51 and the print engine control unit 55 executes image formation by the print engine unit based on the image data. The process is then finished.

Figure 22:
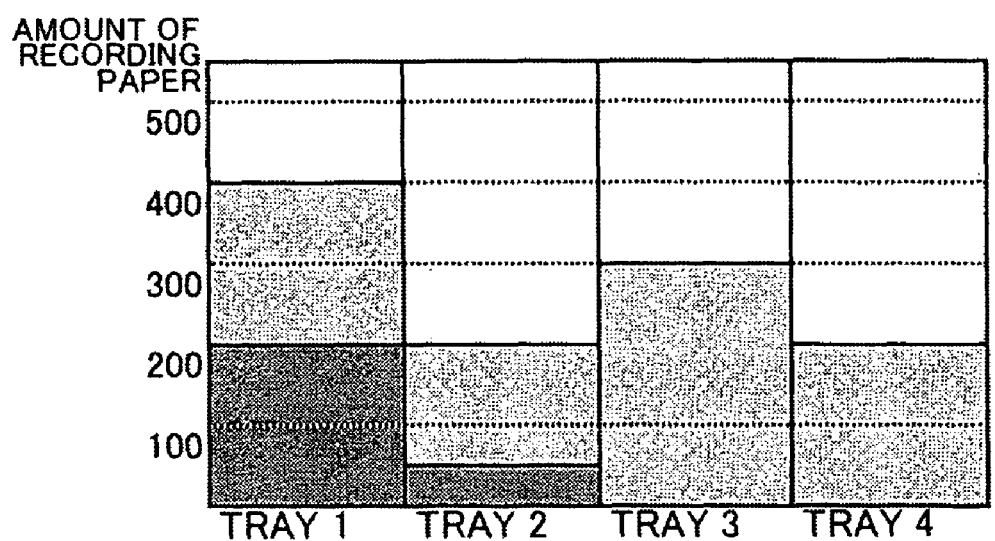
FIG. 22 is a diagram showing information sent to the terminal apparatus in the third embodiment.

On the other hand, at step S402, in a case where the image forming apparatus is waiting for the reserved printing, the notification unit 64 displays the waiting condition for the reserved printing in the display unit 54 of the image forming apparatus, as shown in FIG. 20. As shown in step S405, the transmission control unit 57 sends reservation information, shown in FIG. 21 and FIG. 22, to the terminal apparatus. At this time, the terminal apparatus may display the reservation information. The graph and chart shown in FIG. 21 and FIG. 22 are for a case where the image forming apparatus has multiple print trays 11, 45, 46, and 47 as shown in FIG. 17, and the remaining amount of recording paper 19 in each tray and the amount of recording paper 19 necessary for the reserved printing can be easily read. The user of the terminal apparatus sees this information, makes a judgment as to whether printing is possible, and newly opens the device driver to execute printing designation.

Next, through the control of the transmission control unit 57, the printing data transmission unit 58 receives the printing information of the print job of normal printing from the terminal apparatus via the interface unit 56, as shown in step S406. That is, the printing information is received prior to the printing data.

The received printing information is sent to the consumable material usage amount detection unit 66. As shown in step 407, the consumable material usage amount detection unit 66 detects the amount of recording paper 19 to be used for the print job of normal printing from the printing information. At this time, the number of sheets to be used is set as A. The needed number of sheets A of recording paper 19 is passed to the consumable material comparison unit 65.

As shown in step S408, the remaining amount detection unit 61 detects the remaining amount of sheets of recording paper 19 held in the print tray 11. At this time the remaining number of sheets is set as B. The remaining number of sheets B of recording paper 19 is passed to the consumable material comparison unit 65.

As shown in step S409, the reserved printing necessary amount detection unit 63 detects the amount of sheets of the recording paper 19 necessary for the reserved printing stored in the printing pager storage unit 62. At this time, the necessary number of sheets is set as C. The necessary number of sheets C of recording paper 19 is passed to the consumable material comparison unit 65.

The consumable material comparison unit 65 references the to be used number of sheets A of recording paper 19, detected in the manner described above, and compares the necessary number of sheets C to the remaining number of sheets B. As shown in step S410, the consumable material comparison unit 65 then makes a judgment as to whether the amount of recording paper 19 necessary for reserved printing is ensured using $B-A \geq C$. That is, the consumable material comparison unit 65 makes a judgment as to whether necessary amount C of recording paper 19 is equal to or greater than the number of sheets A to be used subtracted from the remaining number of sheets B of recording paper 19 detected by the remaining amount detection unit 61.

In a case where the number of sheets to be used A subtracted from the remaining number of sheets B is less than the necessary number of sheets C, as shown in step S411, normal printing is allowed, the notification unit 64 notifies the terminal apparatus and requests the sending of printing data corresponding to the previously received printing information, and the printing data of the received print job of normal printing is converted into image data. The printing data is received as long as there is not a lack of the amount of recording paper 19 necessary for the reserved printing. Accordingly, the burden placed on the network and image forming apparatus can therefore be reduced.

As shown in step S412, the printing data reception unit 58 then receives, via the interface unit 56, printing data corresponding to the printing information from the terminal apparatus that received the printing information. Therefore, within the image forming apparatus, the printing data and printing information come together, becoming the print job of normal printing.

The print job of normal printing is analyzed under the control of the CPU 51 and image formation is executed based on the printing data. That is, as shown in step S413, the print engine control unit 55 controls the print engine unit to form images on sheets of the recording paper 19 based on the printing data, after which the process is finished.

At step S410, in a case where the number of sheets to be used A subtracted from the remaining number of sheets B is less than the necessary number of sheets C, as shown in step S414, the notification unit 64 then sends a notification for prompting the replenishment of the recording paper 19 to be used in the normal printing to the terminal apparatus that sent the print job including the printing data for executing normal printing. As shown in FIG. 16, the notification is then displayed in the display unit 54 of the image forming apparatus. By notifying the terminal apparatus about the condition of prompting for the replenishment of the recording paper 19 to be used in the normal printing, the user using the terminal apparatus is notified of the condition and can replenish the recording paper 19, so that the necessary amount of the recording paper 19 necessary for the reserved printing can be ensured and the recording paper 19 can be replenished for normal printing as well. Accordingly, the lack of recording paper 19 during reserved printing can be prevented.

As shown in step S415, the remaining amount detection unit 61 then makes a judgment as to whether the recording paper 19 has been replenished. In a case where the result is that the recording paper 19 has been replenished, as shown in step S416, the notification unit 64 notifies the terminal apparatus, which sent the printing data, that the recording paper 19 has been replenished and this replenished condition is displayed in the display unit of the terminal apparatus, as shown in FIG. 17. Next, as shown in step S417, normal printing is allowed.

As shown in step S418, the printing data reception unit 58 then receives, via the interface unit 56, printing data corresponding to the printing information from the terminal apparatus that received the printing information. Therefore, within the image forming apparatus, the printing data and printing information come together, becoming the print job of normal printing.

The print job of normal printing is analyzed under the control of the CPU 51 and image formation is executed based on the printing data. That is, as shown in step S419, the print engine control unit 55 controls the print engine unit to form the image on every sheet of the recording paper 19 based on the printing data, after which the process is finished.

At step S415, in a case where the recording paper 19 is not replenished, the normal printing is prohibited, as shown in step S420. That is, the print engine control unit 55 prohibits the reception of the printing data corresponding to the printing information of the print job received from the terminal apparatus. By prohibiting the reception of the printing data for normal printing from the terminal apparatus, the burden placed on the network and image forming apparatus is reduced by not receiving printing data that includes information concerning the lack of recording paper 19 serving as the consumable material for reserved printing during execution of the normal printing.

As shown in step S421, the notification unit 64 then notifies the terminal apparatus that printing is prohibited because the recording paper 19 necessary for the normal printing has not been replenished, and this condition is displayed in the display unit of the terminal apparatus, as shown in FIG. 18. By informing the terminal apparatus that the reception of the printing data corresponding to the received printing information has been prohibited, the user using the terminal apparatus that sent the printing information can be informed of the condition of the prohibited printing. The burden placed on the network and image forming apparatus is therefore reduced by not receiving printing data that includes information concerning the lack consumable material during execution of the normal printing.

As shown in step S422, the process is then finished. At this time, the aforementioned display is erased from the display unit of the terminal apparatus and the display unit 54 of the image forming apparatus.

In a case where the amount of recording paper 19 to be used for the printing data corresponding to the printing information of the newly received print job and a judgment is made that the remaining amount of recording paper 19 serving as the consumable material is less than the amount of recording paper 19 necessary for the reserved printing, the reception of the printing data corresponding to the received printing information is prohibited until the recording paper 19 is replenished. Printing can therefore be started or finished at the time designated in the reserved printing because the necessary amount of the recording paper 19 necessary for the reserved printing is ensured. The designation of reserved printing, formation of the image based on the printing data, and the like are the same as that of the first embodiment and an explanation will therefore be omitted.

In the manner described above, the image forming apparatus described in the third embodiment detects whether there is a lack of consumable material by comparing the necessary amount of recording paper 19 necessary for the designated reserved printing to the remaining amount of recording paper 19 serving as the consumable material. The user using the terminal apparatus can be informed of the consumable material information by notification of the information concerning the consumable material detected by the terminal apparatus that newly receives the printing data. Accordingly, even in a case where there is a lack of consumable material, the lack of consumable material during the image formation based on the designated reserved printing can be prevented by previously notifying the user of this condition.

In addition, during the designation of the reserved printing, for every occasion when the printing data is newly received for normal printing, the printing information corresponding to this printing data is also received and the amount of the recording paper 19 to be used is detected from the printing information. In a case where the corresponding print job cannot be completed based on the detected amount of recording paper 19 to be used, printing is not executed until the recording paper 19 is replenished. The user who newly sent the printing data as normal printing from the terminal apparatus can therefore replenish the recording paper 19 to execute the normal printing. Accordingly, the lack of recording paper 19 necessary for the reserved printing can be prevented.

Fourth Embodiment

In the first and second embodiments, the image forming apparatus is described as using the recording paper 19 as the consumable material. However, the consumable material is not limited to the recording paper 19 and the fourth embodiment is explained using toner as the consumable material. In the following, the fourth embodiment is described using toner as the consumable material, in the same manner that the recording paper 19 is used in the first and second embodiments.

Figure 23:
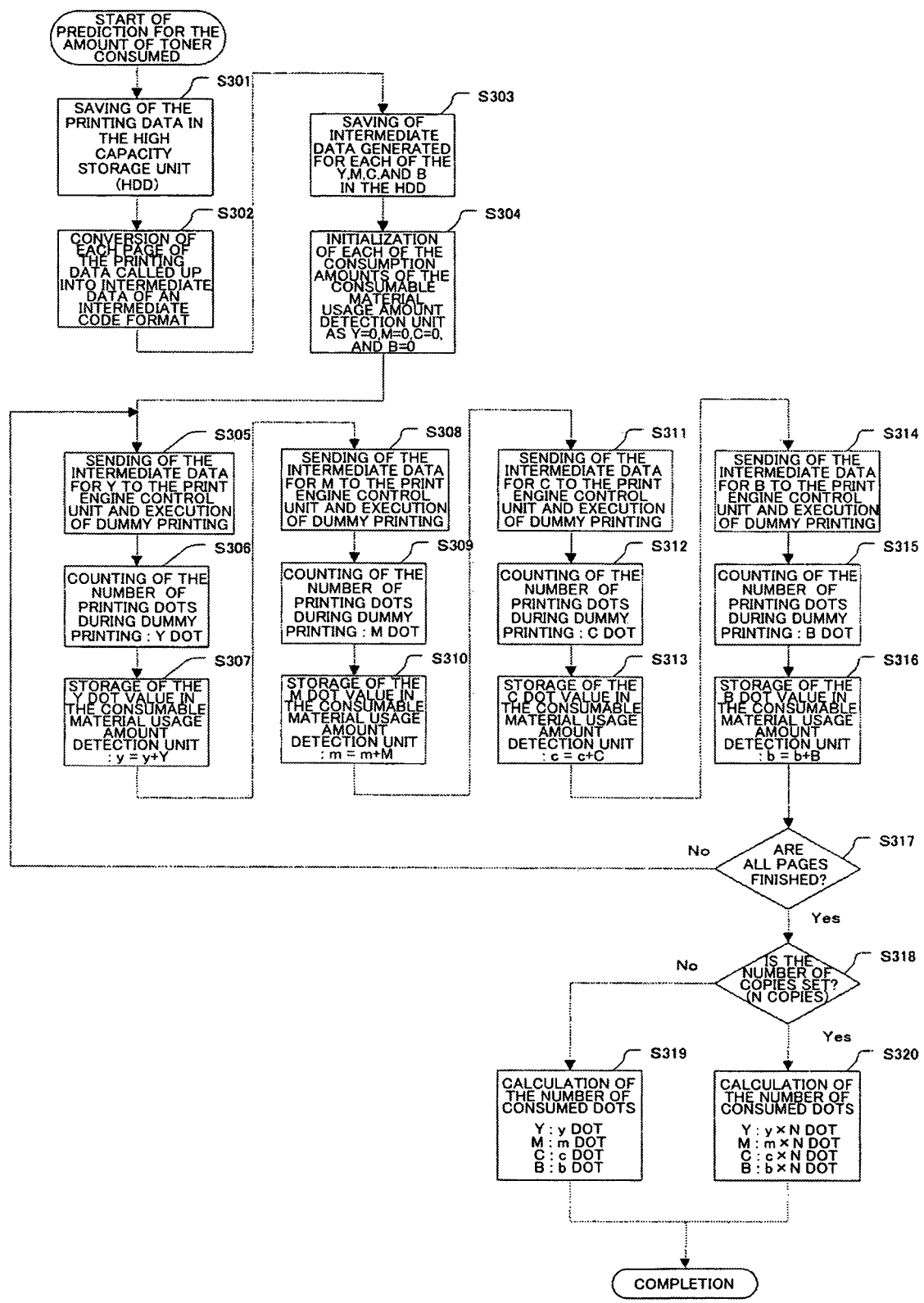
FIG. 23 is a diagram describing the process executed to detect the amount of toner used in the image forming apparatus of the fourth embodiment.

To treat the toner serving as the consumable material in the same manner as the recording paper 19, the method for detecting the remaining amount of toner in the image forming apparatus, the amount of toner used to form the image based on the printing data of the print job of normal printing, and the amount of toner necessary for forming the image based on the printing data of the print job designated by the reserved printing is explained referencing FIG. 23.

First, upon the sending of the print job from the terminal apparatus, the print job is analyzed under the control of the CPU 51. As shown in step S301, the CPU 51 then stores the printing data included in the print job in the high capacity storage unit (HDD).

Next, as shown in step S302, the CPU 51 calls up each page of the printing data and converts it into intermediate data for each color in a intermediate code format, using the program stored in the ROM 53.

As shown in step S303, the CPU 51 then saves in the HDD the intermediate data generated for each color yellow (Y), magenta (M), cyan (C), and black (B).

As shown in step S304, after saving the intermediate data in the HDD, As shown in step S304, the CPU 51 initializes default values of y, m, c, and b corresponding to each color for calculating the amount of each color used. That is, the values are set so that b=0, c=0, m=0, and y=0. The letter y corresponds to the yellow (Y) toner, m corresponds to the magenta (M) toner, c corresponds to the cyan (C) toner, and b corresponds to the black (B) toner.

First, the expected amount of yellow to be used per page is calculated. As shown in step S305, under the control of the CPU 51, the intermediate data in the intermediate code format concerning the yellow toner is passed to the print engine control unit and dummy printing is executed.

The print engine unit exposes the photosensitive body 31Y using the exposure unit 33Y to remove the charge from the surface of the photosensitive body 31Y. At this time, the intermediate data is converted into image data of an image format displayed by a series of dots. The actual exposure would be executed based on these dots. The expected amount of toner affixed to the photosensitive body 31Y can be calculated by counting the dots formed by the conversion of the intermediate data into the image data, that is, the exposed portion. The dummy printing is a process for counting the dots of the intermediate data converted into the image data in the manner described above, in which the print engine unit is activated but the feeding of the recording paper 19, the actual exposure by the exposure unit 33Y, and the rotation of the photosensitive body 31Y are not executed.

As shown in step S306, the consumable material usage amount detection unit 66 counts the number of dots through the dummy printing. The number of dots counted in the dummy printing is set as Y. As shown in step S307, after counting the dots, the consumable material usage amount detection unit 66 stores the counted number of dots Y as y=y+Y and sets this value as the amount of yellow toner to be used. The value y is first initialized at the default value of 0, but, in a case where there is printing data indicating the execution of printing across multiple pages, the number of pages will be added by the execution of this process.

Next, the expected amount of magenta to be used is calculated in the same manner as the expected amount of yellow to be used. As shown in step S308, under the control of the CPU 51, the intermediate data in the intermediate code format concerning the magenta toner is passed to the print engine control unit and dummy printing is executed. As shown in step S309, the consumable material usage amount detection unit 66 counts the number of dots through the dummy printing. The number of dots counted in the dummy printing is set as M. As shown in step S310, after counting the dots, the consumable material usage amount detection unit 66 stores the counted number of dots M as m=m+M and sets this value as the amount of magenta toner to be used.

Next, the expected amount of cyan to be used is calculated in the same manner as the expected amount of yellow to be used. As shown in step S311, under the control of the CPU 51, the intermediate data in the intermediate code format concerning the cyan toner is passed to the print engine control unit and dummy printing is executed. As shown in step S312, the consumable material usage amount detection unit 66 counts the number of dots through the dummy printing. The number of dots counted in the dummy printing is set as C. As shown in step S313, after counting the dots, the consumable material usage amount detection unit 66 stores the counted number of dots C as c=c+C and sets this value as the amount of cyan toner to be used.

Finally, the expected amount of black to be used is calculated in the same manner as the expected amount of yellow to be used. As shown in step S314, under the control of the CPU 51, the intermediate data in the intermediate code format concerning the black toner is passed to the print engine control unit and dummy printing is executed. As shown in step S315, the consumable material usage amount detection unit 66 counts the number of dots through the dummy printing. The number of dots counted in the dummy printing is set as B. As shown in step S3316, after counting the dots, the consumable material usage amount detection unit 66 stores the counted number of dots B as b=b+B and sets this value as the amount of black toner to be used.

As shown in step S317, after counting the dots of each color per page, under the control of the CPU 51, a judgment is made as to whether the dots on all of the pages of the printing data included in the print job have been counted. That is, whether the process for counting the dots of each color on each page has been repeated for all of the pages.

As shown in step S318, after counting the dots of each color on all of the pages, under the control of the CPU 51, information about whether the number of copies to be printed is designated is read from the print job. In a case where there is one copy to be printed, the number of copies is not designated and, in a case where there are multiple copies to be printed, the number of copies is designated. In a case where multiple copies are to be printed, the number of copies is set as N.

In a case where the number of copies is not designated at step S317, the consumable material usage amount detection unit 66 detects the number of dots of each color of toner in the print job from the number of dots counted in the manner described above. That is, yellow is the y dots, magenta is the m dots, cyan is the c dots, and black is the b dots. After detecting the number of dots, the detected number of dots of each color is set as the amount of toner of each color to be used. The process is then finished.

On the other hand, in a case where the number of copies is designated at step S317, the consumable material usage amount detection unit 66 detects the number of dots of each color of toner in the print job from the product of the number of copies (N) and the number of dots counted in the manner described above. That is, yellow is y×N dots, magenta is m×N dots, cyan is c×N dots, and black is b×N dots. After detecting the number of dots, the detected number of dots of each color is set as the amount of toner of each color to be used. The process is then finished.

The remaining amount of toner can be calculated by applying the aforementioned process for counting the number of dots. The remaining amount of toner is detected by the remaining amount detection unit 61. First, the average number of printing dots in a single toner cartridge 37 is sought through the amount of toner in a single toner cartridge 37 and the measurement data of the average number of printable dots. The remaining amount of toner can be found by subtracting the toner consumed for every execution of printing from the average number of printing dots of a single toner cartridge 37. The amount of toner consumed for every execution of printing can be detected from the printing data by the process shown in FIG. 23.

The amount of toner necessary for the designated reserved printing can be calculated in the same manner as described above for calculating the amount to be used. Dummy printing is executed for the printing data of the print job designated by the reserved printing, in the manner described above, and the number of counted dots is saved in the reserved printing necessary amount detection unit 57. The reserved printing necessary amount detection unit 57 then detects the necessary amount of toner to be used for the reserved printing by acting as the consumable material usage amount detection unit 66. In the same manner as the necessary amount of recording paper 19 in the first through third embodiments, the amount of toner to be used may be set as the necessary amount, but it is also possible to add an extra amount to the amount used and set the new amount as the necessary amount.

By detecting the necessary amount of toner through the process of converting the printing data designated by the reserved printing into the image formed on the recording paper 19, in the same manner as the recording paper in the first and second embodiments, the remaining amount and the necessary amount for the reserved printing of toner, serving as the consumable material, can be detected for each unit. That is, in the same manner as the first and second embodiments, the toner is treated as the consumable material and, in the same manner as the recording paper 19, the amount of toner, serving as the consumable material, can be ensured even where newly received printing data is sent from the terminal apparatus when reserved printing is designated. In the same manner as the first and second embodiments, the user is prompted to replenish the toner by a notification sent by the notification unit to the terminal apparatus that sent the print job containing the newly received printing data when the remaining amount of toner becomes less than the necessary amount of toner or when the amount that is the necessary amount of toner subtracted from the remaining amount of toner becomes less than the necessary amount of toner. Therefore, because of the replenishment of the toner by the user, the lack of toner during the reserved printing can be prevented even in a case where there is insufficient toner. That is, the necessary amount of toner for the reserved printing can be ensured and stoppage of printing or decrease in printing quality due to the lack of toner can also be prevented.

In a case where the toner is not replenished, image formation based on the newly received printing data can be stopped or cancelled. The notification unit can then notify the terminal apparatus that the image formation based on the newly received printing data has been stopped or cancelled. The notification unit 64 further informs the terminal apparatus and image forming apparatus that the remaining amount of toner is low through the "Toner Low" display or that there is no toner remaining through the "Toner Empty" display. This notification is then displayed in the display unit of the terminal apparatus and the display unit 54 of the image forming apparatus.

The toner can be thought of as the consumable material in the same manner that the recording paper 19 was thought of as the consumable material in the first and second embodiments. That is, in the same manner as the first and second embodiments, the lack of toner can be detected by a comparing the remaining amount of toner to the amount of toner necessary for the reserved printing. The user using the terminal apparatus can be informed of the toner information by notification being received by the terminal apparatus that newly received the printing data concerning the detected toner information. Therefore, in a case of a lack of toner during the execution of the image formation based on the designated reserved printing, the shortage of toner can be prevented during the reserved printing by the terminal apparatus being informed of the toner information and the user replenishing the toner.

In addition, in the same manner as the first and second embodiments, by notifying the terminal apparatus that replenishment of the toner is necessary, the user can see this information and replenishes the toner. Therefore, the amount of toner necessary for the reserved printing can be ensured and normal printing can be executed by replenishing the toner. The lack of toner during the reserved printing can also be prevented.

In the image forming apparatus of the present invention, the photosensitive body 31 or the fusion unit 40 are also provided as other consumable materials. This is achieved by comparing the number of sheets of reserved printing and the number of sheets of general printing of the image forming apparatus. In addition, the image forming apparatus of the present invention is not limited to a printer and may also be applied to complex machines or copying machines.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. An image forming apparatus for forming an image on a medium based on printing data received from a connected terminal apparatus and capable of designating reserved printing for executing a reserved printing job at a prescribed time, comprising:

a printing data reception unit for receiving the printing data for said reserved printing job from said terminal apparatus;

a reserved printing necessary amount detection unit for detecting a necessary amount of consumable material, based on the amount of said consumable material to be used for the reserved printing job;

a remaining amount detection unit for detecting a remaining amount of said consumable material;

a consumable material comparison unit for comparing the remaining amount detected by said remaining amount detection unit to the necessary amount detected by said reserved printing necessary amount detection unit;

a notification unit for notifying said terminal apparatus about a condition of said consumable material based on a comparison by said consumable material comparison unit; and a controlling unit for controlling printing of the reserved printing job at the prescribed time and printing of a normal printing job that is received by the image forming apparatus before the prescribed time, wherein the normal printing job is performed when the remaining amount detected by said remaining amount detection unit is more than the necessary amount detected by said reserved printing necessary amount detection unit, and said normal printing job is suspended when the remaining amount detected by said remaining amount detection unit becomes equal to the necessary amount detected by said reserved printing necessary amount detection unit.

2. The image forming apparatus according to claim 1, wherein said notification unit notifies said terminal apparatus, which sent printing data newly received by said printing data reception unit for the normal printing job, to urge replenishing of said consumable material in a case where a result of the comparison, performed by said consumable material comparison unit, of the remaining amount detected by said remaining amount detection unit and the necessary amount detected by said reserved printing necessary amount detection unit is that the remaining amount of consumable material is less than the necessary amount of consumable material, in accordance with the printing data newly received by said printing data reception unit when the reserved printing is designated.

3. The image forming apparatus according to claim 1, further comprising a consumable material usage amount detection unit for detecting the amount of said consumable material used in the formation of the image based on the printing data, wherein said notification unit notifies said terminal apparatus, which sent printing data newly received by said printing data reception unit for the normal printing job, to urge replenishing of said consumable material in a case where the result of the comparison, performed by said consumable material comparison unit, is that the amount that is the to be used amount of consumable material detected by said consumable material usage amount detection unit subtracted from the remaining amount of consumable material detected by said remaining amount detection unit is less than the necessary amount of consumable material detected by said reserved printing necessary amount detection unit, in accordance with the printing data newly received by said printing data reception unit when the reserved printing is designated.

4. The image forming apparatus according to claim 3, wherein said consumable material usage amount detection unit detects the amount of consumable material used for the image formation, before formation of the image based on the printing data newly received by said printing data reception unit.

5. The image forming apparatus according to claim 3, wherein:
said printing data reception unit receives consumable material including information concerning the amount of consumable material used for forming the image based on the printing data prior to receiving the printing data; and
said consumable material usage amount detection unit detects the amount of consumable material used from the consumable information.

6. The image forming apparatus according to claim 5, wherein said notification unit demands that the printing data corresponding to previously sent printing information be sent to the terminal apparatus that sent the printing information in a case where the result of the comparison, performed by said consumable material comparison unit, is that the amount that is the used amount of consumable material detected by said consumable material usage amount detection unit subtracted from the remaining amount of consumable material detected by said remaining amount detection unit is more than or equal to the necessary amount of consumable material detected by said reserved printing necessary amount detection unit, in accordance with the printing data newly received by said printing data reception unit when the reserved printing is designated.

7. The image forming apparatus according to claim 2, wherein image formation based on the printing data newly received from said terminal apparatus is stopped in a case where said consumable material is not replaced after said notification unit notifies said terminal apparatus, which sent the printing data newly received by said printing data reception unit, to urge replenishing of said consumable material.

8. The image forming apparatus according to claim 6, wherein said notification unit notifies said terminal apparatus about stoppage of image formation based on the printing data in a case where said consumable material is not replaced after said notification unit notifies said terminal apparatus, which sent the printing data newly received by said printing data reception unit, to urge replenishing of said consumable material.

9. The image forming apparatus according to claim 5, wherein reception of the printing data corresponding to the consumable material information from said terminal apparatus that received only the consumable material information is prohibited in a case where said consumable material is not replenished after said notification unit notifies said terminal apparatus that received only the consumable material information to urge replenishment of said consumable material.

10. The image forming apparatus according to claim 8, wherein said notification unit gives notification that reception of the printing data corresponding to the consumable material information from said terminal apparatus that received only the consumable material information is prohibited in a case where said consumable material is not replenished after said notification unit notifies said terminal apparatus that received only the consumable material information to urge replenishment of said consumable material.

11. The image forming apparatus according to claim 1, wherein said reserved printing necessary amount detection unit detects the necessary amount of said consumable material through a process of converting the printing data designated by the reserved printing into the image formed on said medium.

12. The image forming apparatus according to claim 1, wherein said reserved printing necessary amount detection unit detects the necessary amount of said consumable material by adding a prescribed amount to the amount of said consumable material used for the designated reserved printing.

13. The image forming apparatus according to claim 1, containing multiple storage vessels for entering said consumable material used in the image formation based on the printing data received by the printing data reception unit, wherein said remaining amount detection unit detects the amount of said consumable material as an overall amount of said consumable material entered into each of said storage vessels as the remaining amount of said consumable material.

14. The image forming apparatus according to claim 3, wherein image formation based on the printing data newly received from said terminal apparatus is stopped in a case where said consumable material is not replaced after said notification unit notifies said terminal apparatus, which sent the printing data newly received by said printing data reception unit, to urge replenishing of said consumable material.

15. The image forming apparatus according to claim 4, wherein image formation based on the printing data newly received from said terminal apparatus is stopped in a case where said consumable material is not replaced after said notification unit notifies said terminal apparatus, which sent the printing data newly received by said printing data reception unit, to urge replenishing of said consumable material.

16. The image forming apparatus according to claim 1, wherein the consumable material is selected from the group consisting of paper and toner.

17. An image forming apparatus, comprising:
printer means for printing on sheets of paper; and
control unit means for controlling the printer means, the control unit means including
means for receiving first printing data for a reserved printing job that is to be executed at a prescribed time and for receiving second printing data for a normal printing job, the second printing data being received before the prescribed time,
means for determining an amount of paper in the image forming apparatus,
means for actuating the printer means to print the normal printing job, and for suspending the normal printing job after actuating printing the normal printing job if the image forming apparatus runs out of enough paper to also completely print the reserved printing job.

18. The image forming apparatus of claim 17, wherein the control unit means further comprises means for requesting that a user, from whom the second printing data was received, load more paper if enough paper would not be left in the image forming apparatus to print the reserved printing job after printing the normal printing job.

19. The image forming unit of claim 17, wherein the means for actuating the printer means sets an expected amount of paper to print the reserved printing job as a threshold and prints the normal printing job if the amount of paper in the image forming apparatus after completion of the normal printing job would not fall below the threshold.

20. An image forming apparatus for forming an image on a medium based on printing data received from a connected terminal apparatus and capable of designating reserved printing for executing a reserved printing job at a prescribed time, comprising:

a printing data reception unit for receiving the printing data for said reserved printing job from said terminal apparatus;

a reserved printing necessary amount detection unit for detecting a necessary amount of consumable material based on the amount of said consumable material to be used for the reserved printing job;

a remaining amount detection unit for detecting a remaining amount of said consumable material;

a consumable material comparison unit for comparing the remaining amount detected by said remaining amount detection unit to the necessary amount detected by said reserved printing necessary amount detection unit;

a notification unit for notifying said terminal apparatus about a condition of said consumable material based on a comparison by said consumable material comparison unit; and a controlling unit for controlling printing of the reserved printing job at the prescribed time and printing of a normal printing job that is received by the image forming apparatus before the prescribed time, wherein the normal printing job is performed when the remaining amount detected by said remaining amount detection unit is more than the necessary amount detected by said reserved printing necessary amount detection unit, and said normal printing job is not completed when the remaining amount detected by said remaining amount detection unit becomes equal to the necessary amount detected by said reserved printing necessary amount detection unit.

\* \* \* \* \*